United States Patent [19]

Hamanaka et al.

[11] Patent Number: 5,297,255
[45] Date of Patent: Mar. 22, 1994

[54] PARALLEL COMPUTER COMPRISED OF PROCESSOR ELEMENTS HAVING A LOCAL MEMORY AND AN ENHANCED DATA TRANSFER MECHANISM

[75] Inventors: Naoko Hamanaka, Tokyo; Teruo Tanaka, Koyasumachi, both of Japan

[73] Assignee: Hitachi, Ltd., Tokyo, Japan

[21] Appl. No.: 303,626

[22] Filed: Jan. 27, 1989

Related U.S. Application Data

[63] Continuation-in-part of Ser. No. 647,773, Jan. 30, 1991, which is a continuation of Ser. No. 78,656, Jul. 28, 1987, abandoned, and Ser. No. 145,614, Jan. 19, 1988, abandoned.

[30] Foreign Application Priority Data

Jan. 29, 1988 [JP] Japan ................................. 63-17070
Jan. 29, 1988 [JP] Japan ................................. 63-17073

[51] Int. Cl.$^5$ ............................................. G06F 13/00
[52] U.S. Cl. ..................................... 395/200; 395/800;
364/DIG. 1; 364/228; 364/228.3; 364/284;
364/260
[58] Field of Search ................. 364/200; 395/200, 800

[56] References Cited

U.S. PATENT DOCUMENTS

| | | | |
|---|---|---|---|
| 4,780,810 | 10/1988 | Torii et al. ........................... | 364/200 |
| 4,831,512 | 5/1989 | Nakai et al. .......................... | 364/200 |
| 4,951,193 | 8/1990 | Muramatsu et al. ................ | 364/200 |

FOREIGN PATENT DOCUMENTS

0258650A2 3/1988 European Pat. Off. .

OTHER PUBLICATIONS

Burton J. Smith, "Architecture and Applications of the HEP Multiprocessor Computer System", Society of Photo-Optical Instrumentation Engineers Real-Time Signal Processisng IV, vol. 298, Aug. 1981, pp. 241-248.

E. J. Lerner, "Data-Flow Architecture", IEEE Spectrum, vol. 21, No. 4, Apr. 1984, pp. 57-61.

Primary Examiner—Gareth O. Shaw
Assistant Examiner—Kakali Chaki
Attorney, Agent, or Firm—Fay, Sharpe, Beall, Fagan, Minnich & McKee

[57] ABSTRACT

In a parallel computer, there are provided a plurality of processor elements 1-1 to 1-n) connected to each other by a network (2); each of said processor elements including a local memory (6) for holding a program and data related thereto, a processor (3) for performing an instruction in said program, a circuit (5) for transferring the data to the other processor elements, and a circuit (4) for receiving the data sent from the other processor element; a memory area (92:8) constructed of a plurality of reception data areas for temporarily storing data received by said receiving circuit, and a memory (92,8) constructed of a plurality of tag areas, provided for each of the reception data areas, for storing a valid data tag or an invalid data tag indicating that the data in the corresponding reception data area is valid or invalid; a transmitting circuit (5) for transmitting the data to be transmitted with attaching a data identifier predetermined by said data; a receiving circuit for writing the data into one of said plurality of reception data areas in response to the data received from said network, and writing the valid data tag into one of said plurality of reception data areas, said receiving circuit being parallel-operated with said processor; and, an access circuit (38) for reading both the data and tag from one of the reception data areas determined by said data identifier and from the corresponding tag areas in response to the data identifier designated by the instruction which is produced from said program for requiring the data reception, and for repeatedly reading the tag and data from the tag area and reception data area until the valid data tag is read out from the tag area in case that the read tag corresponds to the invalid data tag.

45 Claims, 22 Drawing Sheets

FIG. 3

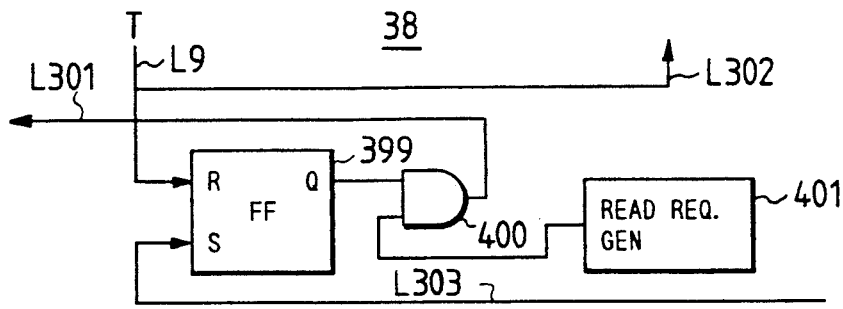

FIG. 4

SEND : OPERATION CODE

R1 : REGISTER NUMBER OF A GENERAL PURPOSE
REGISTER WHICH HOLDS A PROCESSOR
ELEMENT NUMBER OF A DESTINATION
PROCESSOR ELEMENT

R2 : REGISTER NUMBER OF A GENERAL PURPOSE
REGISTER WHICH HOLDS AN ADDRESS OF A
STORAGE AREA OF A LOCAL MEMORY OF THE
DESTINATION PROCESSOR ELEMENT

R3 : REGISTER NUMBER OF A GENERAL PURPOSE
REGISTER WHICH HOLDS A SEND DATA

FIG. 5

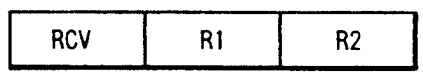

RCV : OPERATION

R1 : REGISTER NUMBER OF A GENERAL PURPOSE
REGISTER WHICH HOLDS A LOCAL MEMORY
ADDRESS FOR A RECEIVE DATA TO BE READ

R2 : REGISTER NUMBER OF A GENERAL PURPOSE
REGISTER WHICH SHOULD HOLD THE
RECEIVE DATA

FIG. 21

| VSEND | R1 | R2 | VR3 |

VSEND : OPERATION CODE
R1 : GENERAL REGISTER NUMBER
R2 : GENERAL REGISTER NUMBER
VR3 : VECTOR REGISTER NUMBER

FIG. 22

| VRCV | R1 | VR2 |

VRCV : OPERATION CODE
R1 : GENERAL REGISTER NUMBER
VR2 : VECTOR REGISTER NUMBER

FIG. 23A

| VSENDL | R1 | VR2 | VR3 |

VSENDL : OPERATION CODE
R1 : GENERAL PURPOSE REGISTER NUMBER
VR2 : VECTOR REGISTER NUMBER
VR3 : VECTOR REGISTER NUMBER

FIG. 23B

| VRCVL | VR1 | VR2 |

VRCVL : OPERATION CODE
VR1 : VECTOR REGISTER NUMBER
VR2 : VECTOR REGISTER NUMBER

PARALLEL COMPUTER COMPRISED OF PROCESSOR ELEMENTS HAVING A LOCAL MEMORY AND AN ENHANCED DATA TRANSFER MECHANISM

This is a continuation-in-part application of the following applications: U.S. patent application Ser. No. 07/647,773 filed on Jan. 30, 1991, which is a continuation application of U.S. patent application Ser. No. 07/78,656 now abandoned filed on Jul. 28, 1987, and U.S. patent application Ser. No. 07/145,614 filed on Jan. 19, 1988 now abandoned.

BACKGROUND OF THE INVENTION

1. Field of the Invention

The present invention relates to a parallel computer constructed of a plurality of processor elements.

2. Description of the Related Art

As one prior art parallel computer arranged by a plurality of processor elements, a first type of parallel computer is known such that each of these processor elements includes a local memory for storing a program executed therein and also data, and the respective processor elements can access to local memories of other processor elements, if required.

In such a sort of parallel computer, when one processor element transfers data to a local memory of the other processor element, after the processor element for transferring the data writes the data into the local memory of the data receiving processor element, this data transferring processor element interrupts the data receiving processor element in order to assure the reference order of the data.

A reference is made, as the relevant prior art parallel computer, to, for instance, "IEEE, PROCEEDINGS OF THE 1985 INTERNATIONAL CONFERENCE ON PARALLEL PROCESSING", pages 782 to 788.

On the other hand, as a second type of the conventional parallel computer, it has been known such a parallel computer that is arranged by a plurality of processor elements coupled with a common memory. In such a conventional parallel computer, a tag representing whether the data are valid (i.e., have been written) or invalid (i.e., have not yet been written) is applied to each word of the common memory. The data communication is performed between the relevant processor elements by utilizing this tag. In other words, when data is transferred from one processor element to the other processor element, the processor element of the data transfer side writes the data into the common memory and then the tag for this written data is changed into the condition "the data has been written".

The processor element of the data receiving side checks whether or not the tag employed for the memory position thereof indicates that "the data is valid" in order to judge whether or not the data to be read is present in the common memory. If the checked tag indicates that "the data is valid", this data is read out and thereafter the above-described tag is changed at the proper timing into "the invalid data condition". As a result, the processor element of the data transfer side can send the data to the processor element of the data reception side without an interruption for the latter-mentioned processor element. Such a sort of parallel computer is described in, for instance, "REAL-TIME SIGNAL PROCESSING IV, VOL 298" August 1981, pages 241 to 248.

In the above-described first type of the conventional parallel computers, since the data calculation is carried out by utilizing the local memory by the respective processor elements, there is very little restriction on the arrangement of the parallel computers when the number of the processor elements is increased. It is therefore relatively easy to increase the number of the processor elements or constructing such a sort of the parallel computers.

However, when the data is transferred from one processor element to the other processor element, the above-described interruption process operation is required at the data receiving processor element.

Such an overhead operation may considerably lower the overall performance of the parallel computers.

In the second type of the conventional parallel computers, on the other hand, there are the following drawbacks. That is, although the above-described overhead operation such as the interruption process operation is not required, the common memory is accessed by all of the processor elements, so that there is a great delay in the access time because the memory accessing operations for all of the processor elements compete with each other. As a result, due to this delay access time, it is difficult to employ a large quantity of processor elements in such a parallel computer. As a consequence, the second type of the parallel computer having the high-speed performance can be hardly realized.

As previously described, there are problems in the above-described first and second types of the conventional parallel computers. To solve these conventional problems, a third type of a parallel computer has been proposed by the Applicants, which is disclosed in the copending Japanese patent applications Nos. 61-182361 (filed on Aug. 1, 1986), and 62056507 (filed on Mar. 13, 1987), or the corresponding U.S. patent application Ser. No. 78656 (filed on Jul. 28, 1987) now abandoned, or the corresponding EPC patent application No. 87111124.1 (filed on Jul. 31, 1987).

In the third type of the parallel computer, no common memory causing the drawback of the second type of the parallel computer is employed, and the local memories same as those of the first type of the parallel computer are employed for the respective processor elements. However, the data reception buffers different from the local memories are additionally required for the respective processor elements in order to prevent the interruption process operation during the data communication.

In this third type of the parallel computer, when the data is transferred, the processor element of the data transfer side simultaneously transfers both the data and the identifier for identifying the data to the other processor element of the data reception side. The transferred data is stored in the reception buffer of the processor element of the data reception side. In the processor element of the data reception side, the reception buffer is associative-retrieved based upon the identifier which has been previously determined for the data in question when this data is required to be accessed, and the data in question is read out therefrom if this data is present therein. As a result, the above-described interruption process operation conducted into the first type of the conventional parallel computer as the major drawback thereof is no longer performed.

To furthermore improve the performance of the third type of the parallel computer having the satisfactory performance, the Applicants have filed another Japanese patent application No. 62-12359 on Jan. 23, 1987 and the corresponding U.S. patent application Ser. No. 145614 on Jan. 19, 1988, now abandoned, relating to a fourth type of a parallel computer.

In accordance with this fourth type of the parallel computer, there are the following particular advantages. That is, in the above-described third type of the parallel computer, the reception processor must be programmed that when plural pieces of the data are required, each of the data must be read out from the reception associative memory in a predetermined sequence for the respective data. In general, however, since the plural pieces of the data are transferred from a plurality of transmission processor, there is no clear discrimination in the data reception order by which these pieces of the data have been received at the reception associative memory. As a result of, for instance, the calculation by other processors, four pieces of data, i.e., A, B, C, and D are received. When the data representative of the maximum value among these four pieces of reception data is retrieved by the reception processor, if the maximum value retrieval program by the reception processor is so designed that the data of A, B, C and D are successively received from the reception associative memory in this order, and a comparison is made between the newly received data and the previously received data so as to find out the maximum value, the reception processor cannot proceed with the above-described maximum value retrieval program even if the data of B, C, or D has been received by the reception buffer prior to the reception of the data of A. As a consequence, it is desired to realize the fourth type of the parallel computer with solving the above-described drawbacks.

In accordance with the above-described fourth type of the parallel computer, as the identifiers for one group of the data to be processed as a whole, both the main identifier commonly used for the above data group and the sub-identifiers specific to the respective data are determined; when the data is transferred from one processor element to the other processor element, this identifier is attached to this data, and in the reception processor element, the main identifier is designated and the data having this designated main identifier is read out from the reception associative memory. As a consequence, even when any one of the data belonging to the same data group, the maximum value retrieval process can be performed without receiving other data.

In the above-described third type of the parallel computer, since the associative memory is employed as the reception buffer and the associative memory is of the specific construction, it is generally difficult to obtain a large memory capacity of this associative memory and the total cost of such an associative memory becomes high. Consequently, there is a problem in cost if the reception buffer having the large memory capacity is arranged by the associative memory. In addition, when the number of the processor element is required to be increased, the resultant cost required for employing the associative memory is increased.

SUMMARY OF THE INVENTION

It is therefore an object of the present invention to provide a parallel computer having a simpler construction, where a local memory is provided in each of processor elements under the condition that no interruption process operation is required during the data transfer between the processors.

Still another object of the present invention is to provide a parallel computer having a simpler arrangement, where one group of the data can be processed in accordance with the data reception order, not the order allocated to these data.

To achieve the above-described first object of the present invention, a parallel computer according to the present invention is characterized by comprising: a processor element which includes a memory area constructed of a plurality of reception data areas for temporarily storing data received by said receiving means, and a memory area (92,8) constructed of a plurality of tag areas, provided for each of the reception data areas, for storing a valid data tag or an invalid data tag indicating that the data in the corresponding reception data area is valid or invalid; a transmitting means (5) for transmitting the data to be transmitted with attaching a data identifier predetermined by said data; a receiving means for writing the data into one of said plurality of reception data areas in response to the data received from said network, and writing the valid data tag into one of said plurality of reception data areas, said receiving means being parallel-operated with said processor; and, an access means (38) for reading both the data and tag from one of the reception data areas determined by said data identifier and from the corresponding tag areas in response to the data identifier designated by the instruction which is produced from said program for requiring the data reception, and for repeatedly reading the tag and data from the tag area and reception data area until the valid data tag is read out from the tag area in case that the read tag corresponds to the invalid data tag.

More specifically, to achieve the above-described object of the invention, there are provided: validating means for setting the content of the tag attached to the word in such a manner that it indicates "valid data" when the data is written from an arbitrary processor element to the tag, where the tag is employed for the word of the local memory, and the tag attached to the word represents whether the data holding this word is valid or invalid; tag accessing means for continuing an inspection until the content of the tag indicates "valid data"; and invalidating means for setting the content of the tag attached to the word in such a manner that it indicates "invalid data" when the word is read out from the processor element holding the word.

In addition, the above-described objects of the present invention can be achieved by another preferred embodiment. The above objects may be achieved by a parallel computer having a local memory and a plurality of processor elements independently operable, where a reception memory is provided which is writable from an arbitrary processor element of each of the processor element of each of the processor elements, a tag memory area is employed with respect to the respective data memory areas of the reception memory; and validating means, tag accessing means, and invalidating means are employed with respect to the reception memory.

Also the above-described objects of the invention may be achieved by a parallel computer where the data to be sent to the other processor is transferred with respect to an address of a local memory in a destination processor which is produced from a main group belonging to this data and also a sub-identifier for identifying the data to be set from other data in the data group; the data is stored in the address of the designated local memory and simultaneously the corresponding tag is brought into a valid condition in the reception processor; when the reception data is read out from the local memory, based upon the main identifier for the data retrieval purpose, the address of the reception data group is generated, and then the desired reception data is read from the local memory based upon this address, and furthermore, the sub-identifier corresponding to the reception data is generated from the read address, and finally both the reception data and sub-identifier are fetched.

Moreover, to achieve the above-described objects of the present invention, the mutually related data group can be received in the order of the data arrivals independent from the execution of the instructions by the processor in view of the execution of the program at the processor of the data reception side.

In addition, since the confirmation whether or not all of the mutually relevant data groups have been arrived is performed by the number of the data reception, the above-described objects of the invention can be achieved.

In the first preferred embodiment, when one processor element writes the data into the word within the local memory of the other processor element, the content of the tag attached to the word by the above-described validating means represents that "the data is valid". Similarly, when one processor element according to the second preferred embodiment writes the data into the word in the reception memory of the other processor element, the content of the tag attached to the word by the above validating means indicates that "the data is valid". The processor element to read out this data, on the other hand, waites for such a condition that the content of the tag attached to the word by the above-described tag accessing means represents that "the data is valid" before the readout of the word and then reads out the data stored in the word. Accordingly, the content of the tag indicates that "the data is invalid" by the above-described invalidating means.

With the above-described circuit arrangement, the data transfer between the processor elements can be correctly and efficiently performed.

Furthermore, by employing both the main identifier and sub-identifier, the following advantage of the preferred embodiment can be obtained when the exchange rule, for instance, can be satisfied in the process of the reception processor. That is, the data required for performing this process is address-generated by utilizing the main identifier, the data which have been arrived at the local memory in the order of the data arrivals are fetched together with the sub-identifier so that the rest time of the reception processor can be minimized.

In addition, the data reception in the processor is performed independent to the instruction execution of the processor, with the result that the number of the instruction execution for receiving the data can be reduced. Also since the confirmation that the reception of a plurality of data is completed is performed by the number of the data, the number of the instruction execution required for the data reception confirmation can be reduced, as compared with that of the case that the data reception confirmation is carried out every data.

BRIEF DESCRIPTION OF THE DRAWINGS

For a better understanding of the invention, reference is made to the following descriptions in conjunction with the accompanying drawings, in which:

FIG. 3 is a schematic circuit diagram of the memory access circuit 38 employed in the processor shown in FIG. 2;

FIG. 4 illustrates a format of a RECEIVE instruction executed in the processor shown in FIG. 1;

FIG. 5 illustrates a format of a SEND instruction executed in the processor shown in FIG. 1;

FIG. 21 shows an instruction format of a V RECEIVE instruction employed in the parallel computer according to the fifth preferred embodiment;

FIG. 22 illustrates a format of a V SEND instruction employed in the parallel computer according to the fifth preferred embodiment;

FIG. 23A represents a format of a VSENDL instruction;

FIG. 23B indicates a format of a VRECEIVEL instruction;

DETAILED DESCRIPTION OF THE PREFERRED EMBODIMENTS

Parallel Computer According to a First Preferred Embodiment

Figure 1:
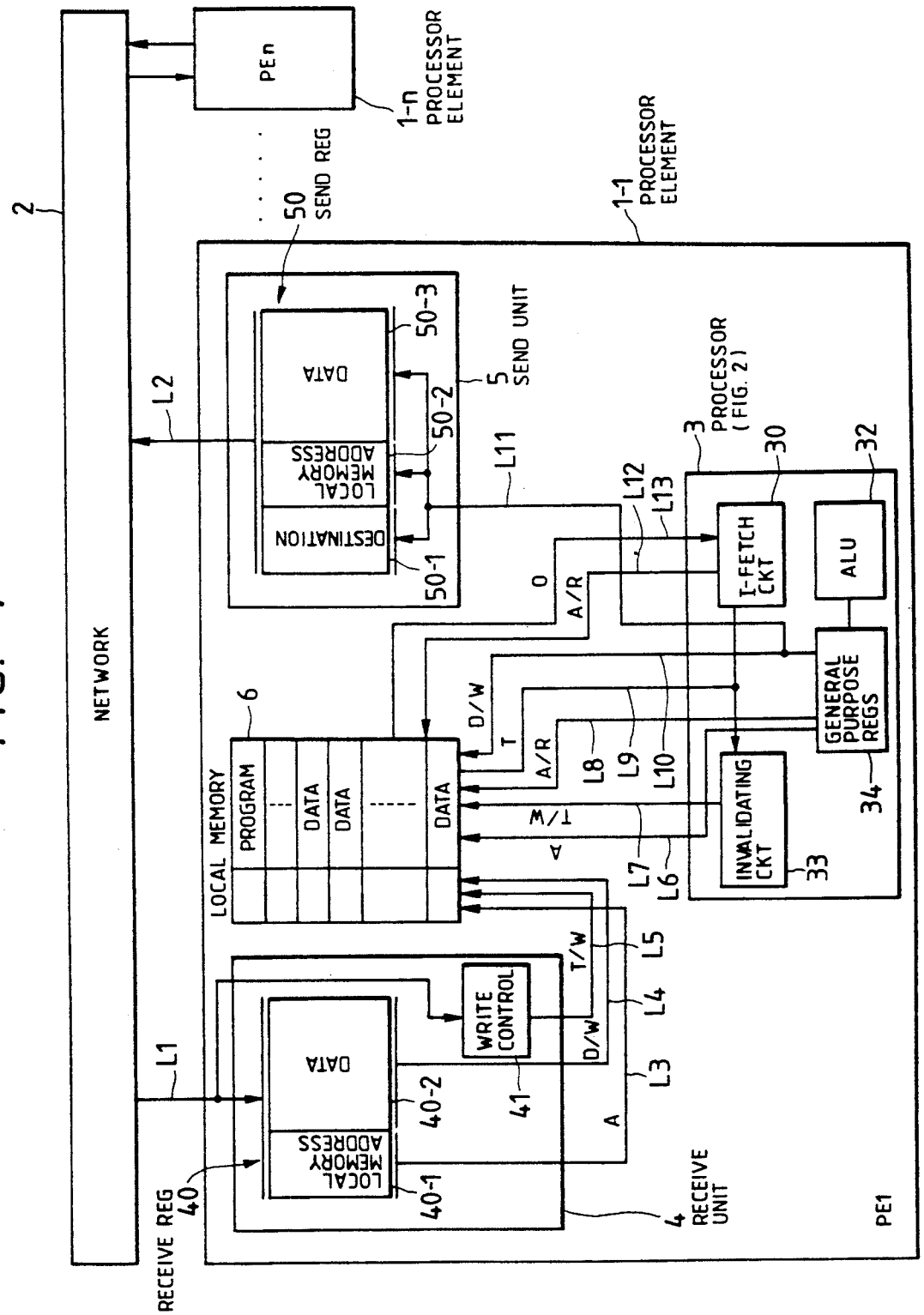
FIG. 1 is a schematic block diagram of an overall circuit arrangement of a parallel computer according to a first preferred embodiment of the invention.

FIG. 1 is a schematic block diagram of a parallel computer according to a first preferred embodiment of the invention. In FIG. 1, reference numerals 1-1 to 1-n indicate "n" pieces of processor elements which can be independently operated. Reference numeral 2 denotes a network which receives a data transmission instruction produced from an arbitrary processor element selected from the processor elements 1-1 through 1-n, and transfers the data to the designated processor element.

Then, circuit arrangements of the processor elements 1-1 to 1-n will be described. Since these processor elements 1-1 to 1-n have the same circuit arrangements, only an internal circuit arrangement of the processor element 1-1 is shown in FIG. 1 for the sake of the simplicity. The processor element 1-1 is constructed of a processor 3, a receive unit 4, a send unit 5 and a local memory 6. According to the feature of the first preferred embodiment, the local memory 3 is employed so as to store the program and also the received data (reception data).

More specifically, the feature of the parallel computer shown in FIG. 1 is that when the received data is stored into the local memory, the tag representative of the valid data is also stored, and the processor 3 judges whether or not the desired data has been stored into the local memory 6 based upon the value of the tag attached to this data.

Figure 2:
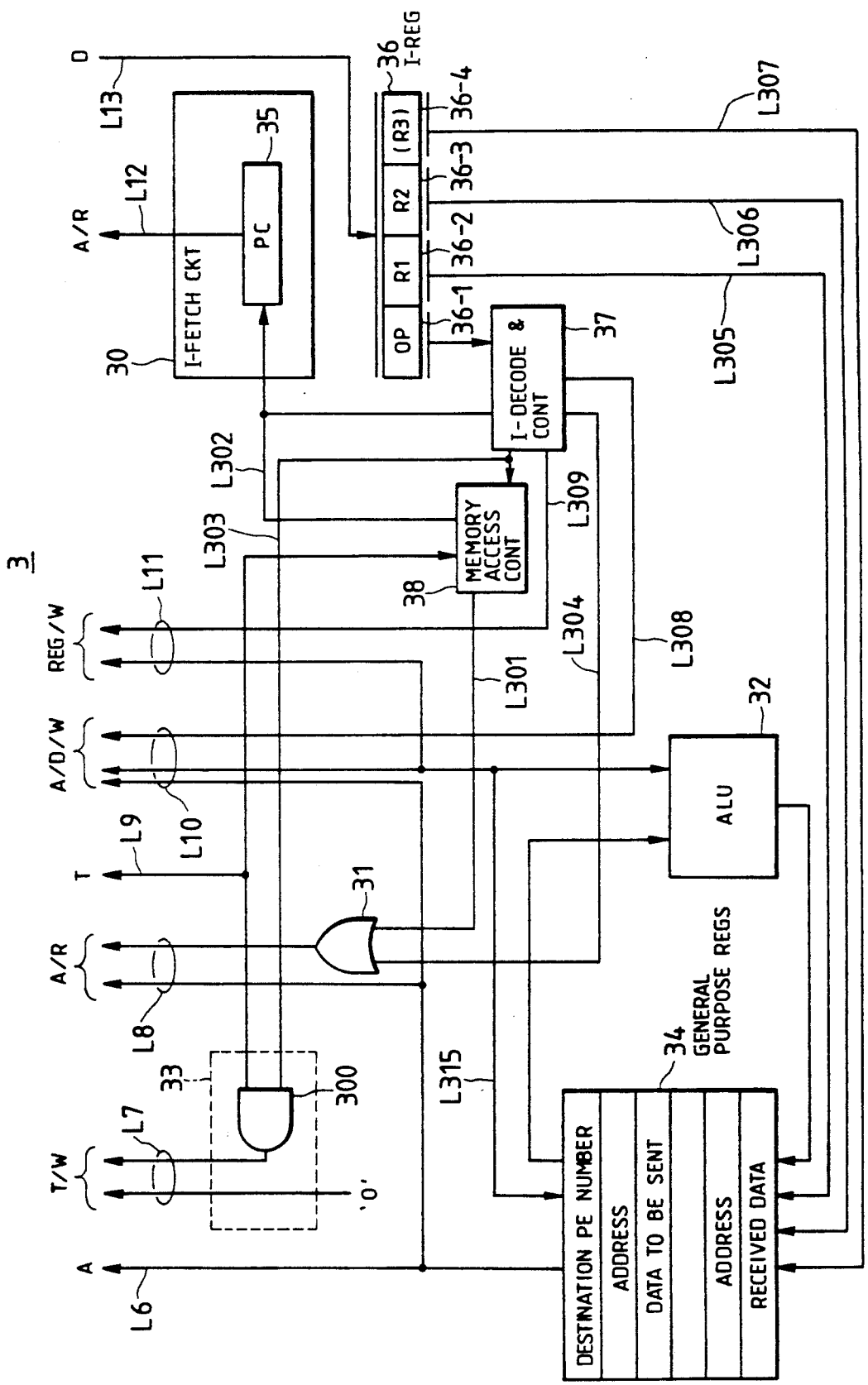
FIG. 2 is a detailed circuit diagram of the processor 3 employed in the parallel computer shown in FIG. 1.

A detailed circuit diagram of the processor 3 is illustrated in FIG. 2. In FIG. 2, reference numeral 30 denotes an instruction fetch circuit, reference numeral 32 indicates an ALU, reference numeral 33 represents a tag invalidating circuit, reference numeral 34 is a general-purpose register group, and reference numeral 35 indicates a program counter.

Also reference numeral 36 denotes an instruction register subdivided into a field 36-1 for storing the instruction code, and three fields 36-2, 36-3, and 36-4 for storing an operand. Reference numeral 37 indicates an instruction decoding controller for controlling the instruction decoding operation and the execution thereof. Reference numeral 38 indicates a memory access circuit which is used to execute the memory access instruction such as a RECEIVE instruction (will be discussed later). Although the processor 3 is of so-called "Neumann type computer", this processor 3 can execute two newly set instructions in addition to the normal instruction set of the Neumann type computer (memory read, memory write, calculation instruction etc.).

In the local memory 6 shown in FIG. 1, an address is attached as a unit of a word so as to store the data having one word length. The local memory 6 is constructed of a plurality of memory areas. Each of the memory areas is arranged by a data unit for storing the data having one unit length of a so-called "word", and additionally a tag unit for storing a 1-bit tag. The tag of the respective memory areas indicates whether or not the valid data has been written into the respective memory areas, and accordingly has the value 1 or value 0. To the local memory 6, both the program to be executed by the processor 3 and the data used in this program are stored. In the local memory 6, there are provided; a first input port for setting a line L3 to an input line of an address, a line L4 to an input line for a demand signal of the data and data write instruction, and a line L5 to an input line for an instruction signal of the tag and tag write instruction; a second input port for setting a line L6 to an input line of the address, and a line L7 to an input line for a demand signal of the tag and tag write instruction; a third input port for setting a line L8 to an input line for a demand signal of the address, tag and data readout instruction, and a line L9 to an input line for a demand signal; and a fourth input port for setting a line L12 to an input line for a demand signal of the address, and data readout instruction, and a line L13 into an output line of the data. In case that more than two demands from the first port, second port and third port have simultaneously arrived, the local memory 6 adjusts properly these demands and responds to the adjusted demands.

The send unit 5 transmits a packet containing the data to be written into the local memory when this data is sent from each of the processor elements to this local memory of the other processor element. This send unit 5 includes a send register 50 therein. The send register 50 is divided into fields 50-1, 50-2 and 50-3. These fields are employed so as to store a destination (processor element number), an address used as the data identifier and data, respectively. It should be noted that the address indicates that the data is stored into the local memory within the destinated processor element.

The receive unit 4 corresponds to an apparatus for receiving the data as well as the address transferred via the network 2 and line L1 from the other processor element, and for writing this received data into the memory area, designated by the received address, of the local memory 6. The receive unit 4 includes a receive register 40 therein. The internal arrangement of this receive register 40 is divided into two fields 40-1 and 40-2. Each of the fields stores the address and data sent from the network 2, respectively. Reference numeral 41 indicates a write controller which outputs both the tag having a value of 1 and the demand signal of tag write instruction to the line L5 when the data is written from the network 2 into the receive register 40.

In the processor 3 within the respective processor elements, the instruction fetch circuit 30 outputs the content of the program counter PC 35 and the demand signal of data readout instruction from the line L12 into the fourth input port of the local memory 6. The instruction designated by the program is read out from the local memory 6 and set via the line L13 into the instruction register 36. The instruction decoding controller 37 decodes the instruction code stored into the field 36-1 among the instructions which have been set into the instruction register 36, and distributes the signal for executing the operation designated by this instruction to the internal circuit of the processor 3, in order to operate the ALU 32, general-purpose register group 34 and so on. When the operation designated by the instruction is accomplished, the instruction decoding controller 37 updates the value of the program counter 35 from the line L 302. The packet to be sent by the respective processor elements is produced by this processor 3 and then sent to the send unit 5. Also the data received from the other processor element into the local memory 6 is processed by this processor 3. The above-described series of the computer operation will be repeatedly performed.

When the packet is set into the send register 50 within the send unit 5, the network 2 transfers the address and data stored in the fields 50-2 and 50-3 of the receive unit 4 provided in the destination processor element 1-i (i=1, 2, —or "n") which is denoted by this field 50-1.

Now, a description will be made to a detailed operation of the parallel computer with reference to the newly introduced "SEND instruction" and "RECEIVE instruction". This SEND instruction corresponds to an instruction by which the data stored into the processor element which has executed this instruction is written into the local memory. FIG. 4 illustrates a format of the SEND instruction. This SEND instruction has the following three operands.

1. destination (destination processor element number)
2. local memory address (address of send data storing area within local memory for destination processor element).
3. send data Each of these operands is stored in the general-purpose register designated by each of two instructions of R1, R2 and R3 fields. This instruction implies that the data designated by the third operand is written into the address, designated by the second operand, of the local memory of the processor element designated by the first operand. When this instruction is executed, the parallel computer according to the first preferred embodiment is operated as follows.

First, the instruction decoding controller 37 of the processor 3 transfers the register numbers R1 to R3 instructed by the instruction via the lines L305 and L307 to the general-purpose register group 34 when this SEND instruction is set to the instruction register 36. As a result, the destination, address and data are read out via the line L309, and set as a packet to the fields 50-1, 50-2 and 50-3 of the send register 50 via the line L11 together with the write demand signal "W" generated by the instruction decoding controller 37. The operations of the SEND instruction are completed with the above-described manner. The subsequent operation is carried out as follows.

When the packet is set in the send register 50, the contents of the registers 50-2 and 50-3 are set in the register 40 in the receive unit 4 of the processor element designated by the field 50-1 of this packet by the operation of the send unit 5 and network 2, as previously described. As a result, the write controller of the send unit 4 of the processor element into which the data has been set generates the tag "T" having a value of "1" and the write signal, and writes the data of the field 40-2 into the data unit of the memory area designated by the address in the field 40-1 from the first port of the local memory 6, and finally writes the value of 1 (i.e., the value indicating that the content of this word is valid) into the tag unit of this word.

As previously described, according to the first preferred embodiment of the invention, when the data is sent from one processor element to the other processor element, a determination is previously made, this data should be stored into a predetermined memory area of the local memory of the processor element, and the data received by the receive unit 4 is directly written into the local memory. As a consequence, while the data is transferred from one processor element to the other processor element, no interruption operation is performed in the processor element at the data reception end.

Then, the newly set instruction "RECEIVE instruction" will now be described. This RECEIVE instruction is an instruction to read the data from the local memory 6 of the processor element where this RECEIVE instruction is executed. FIG. 5 illustrates a format of the RECEIVE instruction. The RECEIVE instruction has two operands.

1. local memory address used as data identifier (address of storage position for received data to be read from local memory)
2. register number (number of general-purpose register into which this data should be stored).

Each of these operands has been stored into the general-purpose register designated by the R1 and R2 fields of this instruction. This instruction implies that the valid data is read out from the address of the local memory designated by the first operand, and this read data is stored into the general-purpose register designated by the second operand.

When this instruction is executed, the parallel computer according to the preferred embodiment is operated as follows.

First, when this instruction is set into the instruction register 36, the instruction decoding controller 37 of the processor 3 outputs the register numbers R1 and R2 designated by this instruction via the respective lines L305 and L306 to the general-purpose register group 34, and also outputs the signal representative of the execution of the RECEIVE instruction to the line L303 so as to initialize the memory access circuit 38 until the address of the local memory 6 is read out from the numbered "R1" general-purpose register within the general-purpose group 39.

As shown in FIG. 3, in the memory access circuit 38, the flip-flop 399 is set by this signal L303. Reference numeral 401 denotes a circuit for generating a readout demand and generates repeatedly the readout demand in synchronism with the operation of the local memory 6. When the flip-flop 399 is set, the AND gate 400 is opened and the readout demand R is output from the circuit 401 to the line L301. These address and readout demand signal are transferred via the line L8 to the third port of the local memory 6.

As a consequence, in response to this readout demand signal the local memory 6 reads both the data and tag from the memory area designated by this address, and outputs them to the lines L9 and L10, respectively.

The received data which has been output to the line L10 is set into the general-purpose register designated by the second operand. Although the tag T which has been read on the line L9 is input into the memory access circuit 38, when this value is equal to "0", the flip-flop 399 (see FIG. 3) is not reset in the memory address circuit 38. The memory readout demand signal is again generated from the readout demand generating circuit 401 (see FIG. 3) to the line L301 so as to repeat the above-identified memory access.

When the tag output on the line L9 is equal to "1", since the value of "1" indicative of the instruction decoding operation has been input from the line L303 in the AND circuit 300 within the invalidating circuit 33, the write demand is output from the AND circuit 300. On the line L7, the value of "0" is continuously output which is used for being written as the invalid tag. Both the address of the local memory which have been output on the line L6, and the invalid tag value of "0" on the line L7, and the write demand send from the AND circuit 300 are output to the second input port, whereby the tag of the memory area designated by this address becomes "0" (the value indicates that the data is invalid). In case that the tag on the line L9 becomes 1, the flip-flop 399 (FIG. 3) is reset, and the tag T is given by the line L302 to the program counter 35 so as to update the content of the program counter 35 in conjunction with the above-described operation in the memory access circuit 38. With the above-described operation, the RECEIVE instruction is accomplished.

According to the above-described process operations, the received data which has been read in the general-purpose register is processed by the processor 3. Employing, for instance, the calculation instruction, the calculation is executed in the calculation is executed in the calculator 32 with respect to this data. With either the result of this calculation operation, or the original received data is written into the local memory 6, the known memory store instruction is performed. The instruction decoding controller 37 is so designed as to generate the memory write signal on the line L308 when decoding this instruction. At this time, the data to be written is read from the first general-purpose register designated by this instruction on the line L315, and the memory address to be written is output on the line L10 from the second general-purpose register. The above-described write signal, address, and data are sent via the line L10 to the local memory 6, and written therein. Also the memory read instruction in the program is performed in a similar manner to the conventional parallel computer.

When the instruction decoding controller 37 decodes this instruction, the read demand is output to the line L304. On the other hand, the memory address is output from the first general-purpose register designated by this instruction on the line L8. The read demand is transferred together with this address to the local memory 6 via the OR gate 31. When the data is read out from this local memory, the read data is stored in the second general-purpose register designated by this instruction. As described above, the tag is neglected during either the normal memory store instruction, or memory read instruction.

As previously described, in case that each of the processor elements constituting the parallel computer according to the first preferred embodiment requires the data transmission from one processor element to the other processor element, with respect to the data used for the data transmission within the local memory of the processor element at the data reception side (this data being predetermined by either a programmer or a complier), the processor element at the data transmission side sends the data to the local memory of the processor element at the data reception side in response to the above-described SEND instruction. This operation is performed by programming the processor element at the data transmission side. Also the processor element at the data reception side is so programmed that this processor element reads this data in response to the RECEIVE instruction. With this circuit arrangement, the data processor element at the data reception side never reads the data before the processor element at the data transmission side writes the data, so that the reference order of the data can be assured.

As previously described, in the parallel computer according to the first preferred embodiment, when the data is sent from one processor element to the other processor element, no interruption operation is required in the other processor element. Since the local memory 6 for storing the program is used for temporarily storing the received data, no specific memory such as an associative memory is needed.

In the parallel computer according to a first preferred embodiment of the invention, although when the RECEIVE instruction was executed and the tag value was equal to "0", the memory access circuit repeatedly accessed the memory so as to check the value of the tag, it is possible that the value of the tag may be read to accomplish the instruction execution when the RECEIVE instruction is executed, the resultant values of this instruction execution may be set into either a flag register or a condition code register, and the RECEIVE instruction may be repeatedly performed until the tag value becomes 1 by way of the condition brunch instruction subsequent to the RECEIVE instruction.

Parallel Computer According to Second Preferred Embodiment

Figure 6:
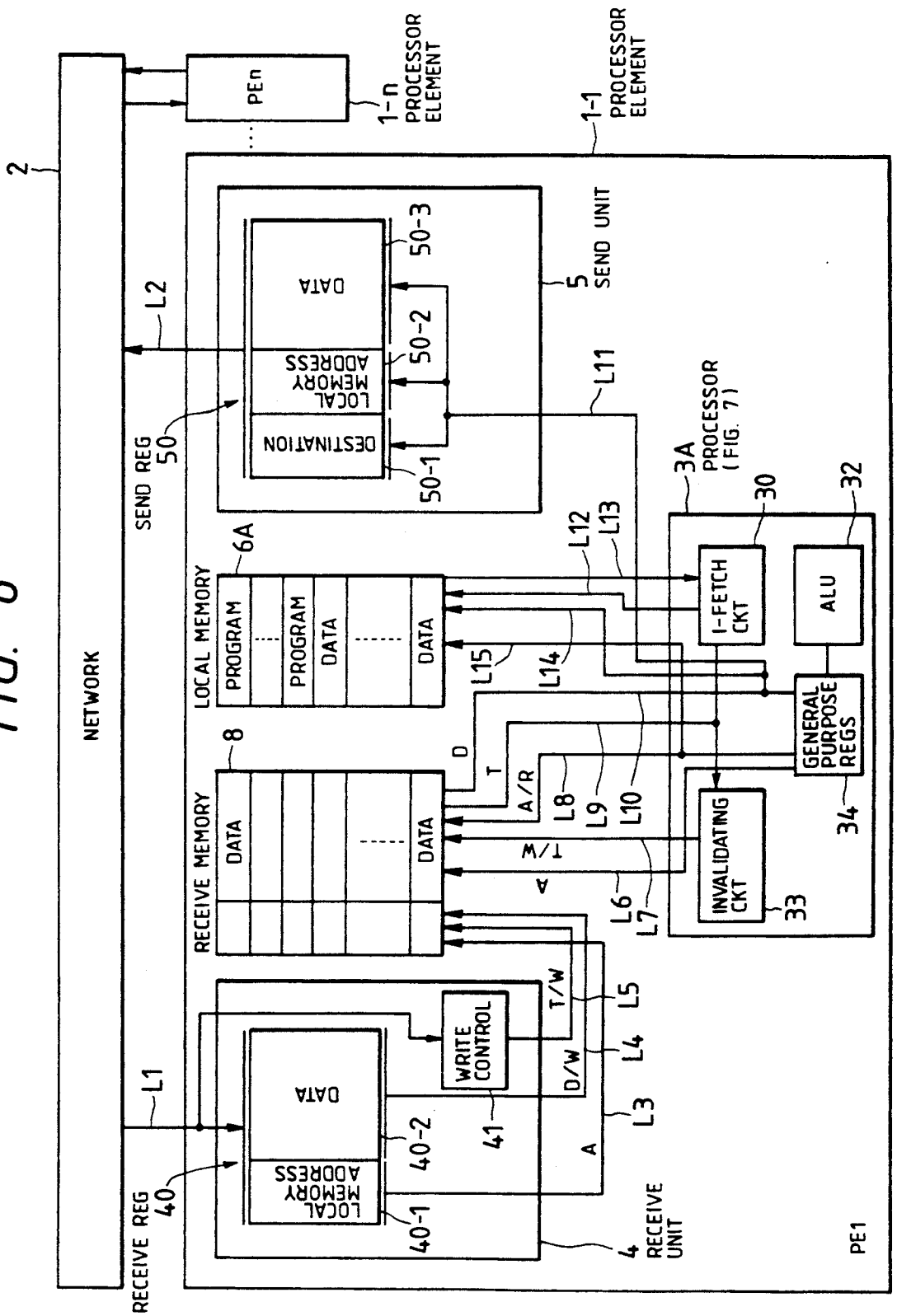
FIG. 6 is a schematic block diagram of an overall circuit arrangement of a parallel computer according to a second preferred embodiment of the invention.

FIG. 6 illustrates a parallel computer according to the second preferred embodiment. The second preferred embodiment has such a feature, as compared with that of the first preferred embodiment, that a receive memory 8 for temporarily storing the received data is separately employed in addition to the local memory 6A. The same reference numerals employed in FIG. 6 indicate the same or similar circuit arrangements shown in FIG. 1.

Figure 7:
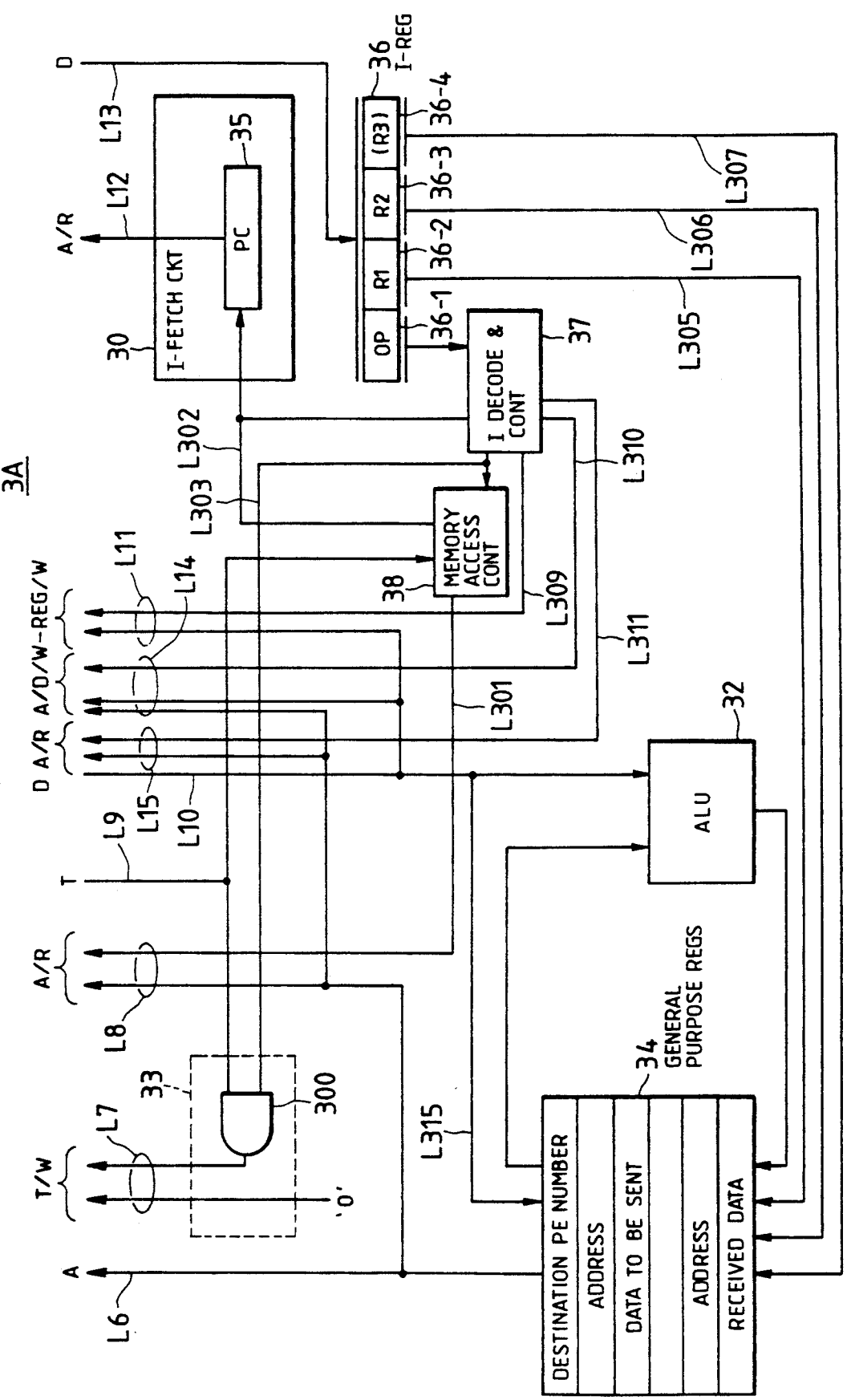
FIG. 7 is a detailed circuit diagram of the processor 3A employed in the parallel computer shown in FIG. 6.

In FIG. 1, although the local memory for storing the program and the data used therein is similar to the local memory 6 shown in FIG. 1, there is no area to store the received data. As a result, no tag area for storing this purpose is employed, which is different from the function of the local memory 6 shown in FIG. 1. A detailed circuit of the processor 3A is shown in FIG. 7. The function of the processor 3A is different from that of the processor 3 shown in FIG. 1 only in that read of the received data is carried out to the receive memory 8.

In the circuit of FIG. 6, a receive memory 8 is constructed of a plurality of memory areas for storing the data having one word length, to which an address is attached as one word unit. In the memory area, there are a data unit for storing the data, and in addition a tag unit for storing one bit tag. The receive memory 8 includes a first port for setting a line L3 to an address input line, a line L4 to an input line of demand signals for the data and data write instruction, and a line L5 to an input line of demand signals for the tag and tag write instruction; a second port for setting a line L6 to an address input line, and a line L7 to an input line of demand signals for the tag and tag write instruction; and a third port for setting a line L8 to an input line of demand signals for the address, tag, and data read instruction, a line L9 to a tag output line, and a line L10 to an output line of the data. When more than two demands have arrived from the respective ports, the receive memory 8 properly adjusts these demands and properly responds to them.

The local memory 6A includes a first port for setting a line L15 to an input line of demand signals for the address and data read instruction, and a line L14 to an input line of a demand signal for the data write instruction and to an input line of the data; and a second port for setting a line L12 to an input line of demand signals for the address and data read instruction, and a line L13 to a data output line. When more than two inputs have arrived from each of these ports, the local memory 9 properly adjusts these inputs and responds to them properly.

The functions of this receive unit 4 are similar to those of the receive unit 4 shown in FIG. 1 except that the received data is written not into the local memory 6A, but to the receive memory 8.

The operations of the respective processor elements 1-1 to 1-n are the same as those of the processor elements shown in FIG. 1 except the following operations.

A SEND instruction employed in the parallel computer according to the second preferred embodiment has the same format (FIG. 4) as the SEND instruction according to the first preferred embodiment. However, in the general-purpose register of the general-purpose register number R2, the address of the receive memory 8 of the processor element, not the local memory address of the processor element at the data transmission side is previously stored. This address indicates an area into which the transmission data should be stored.

A write controller 41 of the receive unit 4 generates a tag having a value of 1 and a write demand, and both these tag and demand, and the address 40-1 within the receive register 40 are sent to the first port of the receive memory 8, at which position the tag and receive data are written.

Although the RECEIVE instruction employed in the second preferred embodiment has the same format as that of the first preferred embodiment, there is such a difference that the address of the general-purpose register indicated by the register number R1 corresponds to the address at the memory position within the receive memory 8. When this instruction is performed, the operation of the parallel computer according to the second preferred embodiment is different from that of FIG. 1 such that the data readout operation with regard to the receive memory 8 is initialized.

That is to say, the instruction decoding controller 37 of the processor 7 outputs the contents (register numbers) of the fields 36-2 and 36-3 of the instruction register 36 to the general-purpose register group 34 via the respective lines L305 and L306, and also outputs via the line L303 a signal impling that the RECEIVE instruction is executed so as to initialize the memory access circuit 38. As a result, the memory read demand signal generated by the memory access circuit 38 via the line L301 together with the first operand as the memory access is output to the third port of the receive memory 8. Accordingly, the receive memory 8 outputs the value of the tag to the line L9 and the data to the line L10. The data output to the line L10 is set to the general-purpose register designated by the second operand. The value of the tag output to the line L9 is input into the memory access circuit 38. When the value of this tag is equal to "0", the memory access circuit 38 again generates the memory read demand signal to the line L301, whereby the above-described memory access operation is repeated. When the value of the tag output to the line L9 is equal to "1", the output of the AND circuit 300 in the invalidating circuit 33 becomes "1". As a consequence, since the first operand output to the line L6 is used as the address, both the value "0" output to the line L7 and the output of the AND circuit 300 are output to the second port of the receive memory 8 as the tag write data and also tag write demand signal, the tag of the word designated by the first operand becomes "0" (the value represents that the data is invalid). When the tag on the line L9 is equal to "1", the memory access circuit 38 accordingly supplies a signal to the program counter 36 from the line L302, so as to update the content of the program counter 35. With the above-described series of the operation, the RECEIVE instruction is completed.

It should be noted that either the normal memory read instruction, or memory write instruction is executed via the line L14 or L15 with respect to the local memory 6A.

The parallel computer according to the second preferred embodiment of the invention is operated similar to that of the first preferred embodiment except that the memory positions which are used for transferring the data between the processor elements are the receive memory 8. Therefore, the same advantages of the parallel computer according to the first preferred embodiment can be achieved in the second preferred embodiment.

In addition to the above-described advantages, there is the following specific effect according to the second preferred embodiment. That is, since according to the second preferred embodiment, the memory (receive memory 8) used for receiving the data is divided into the memory (local memory 6A) for storing the program and data, it can be recognized that there exist two memory spaces such as the memory space of the receive memory 8 and the memory space of the local memory 6A.

As a result, it is easily to produce the programs executed in each of the processor elements. That is to say, amounts of the data and program stored in the own local memory by the respective processor elements are different from each other, depending upon the respective processor elements. As a result, as similar in the first preferred embodiment, when the data is directly written into the local memory of the processor element at the data transmission side, a determination is made which enpty area of the local memory in this processor element is utilized. Based upon this area determination, the program is produced. In case of that a large quantity of data are transferred between the processor elements, this determination becomes very complex. However, in case that the transmission data is written into the receive memory different from the local memory, a determination on the data written into the position of the receive memory can be made irrelevant to the use condition of the local memory. As a consequence, the program can be easily produced. More specifically, when the program executed in this parallel computer is linkage-edited, and the unresolved external reference is solved, both 1), the solution for the unresolved external reference between the receive memories of the respective processor elements, and 2), the solution for the unresolved external reference with in the respective processor elements can be independently executed. Then, if the program to proceed with the calculation while the data is received between the processor elements, is once produced as the subroutine, and the unresolved external reference of above 1) is solved, when this subroutine is utilized to be assembled into another program, it is possible to solve the unresolved external reference of the above 2). In other words, the program can be readily again utilized.

Parallel Computer According to a Third Preferred Embodiment

Figure 8:
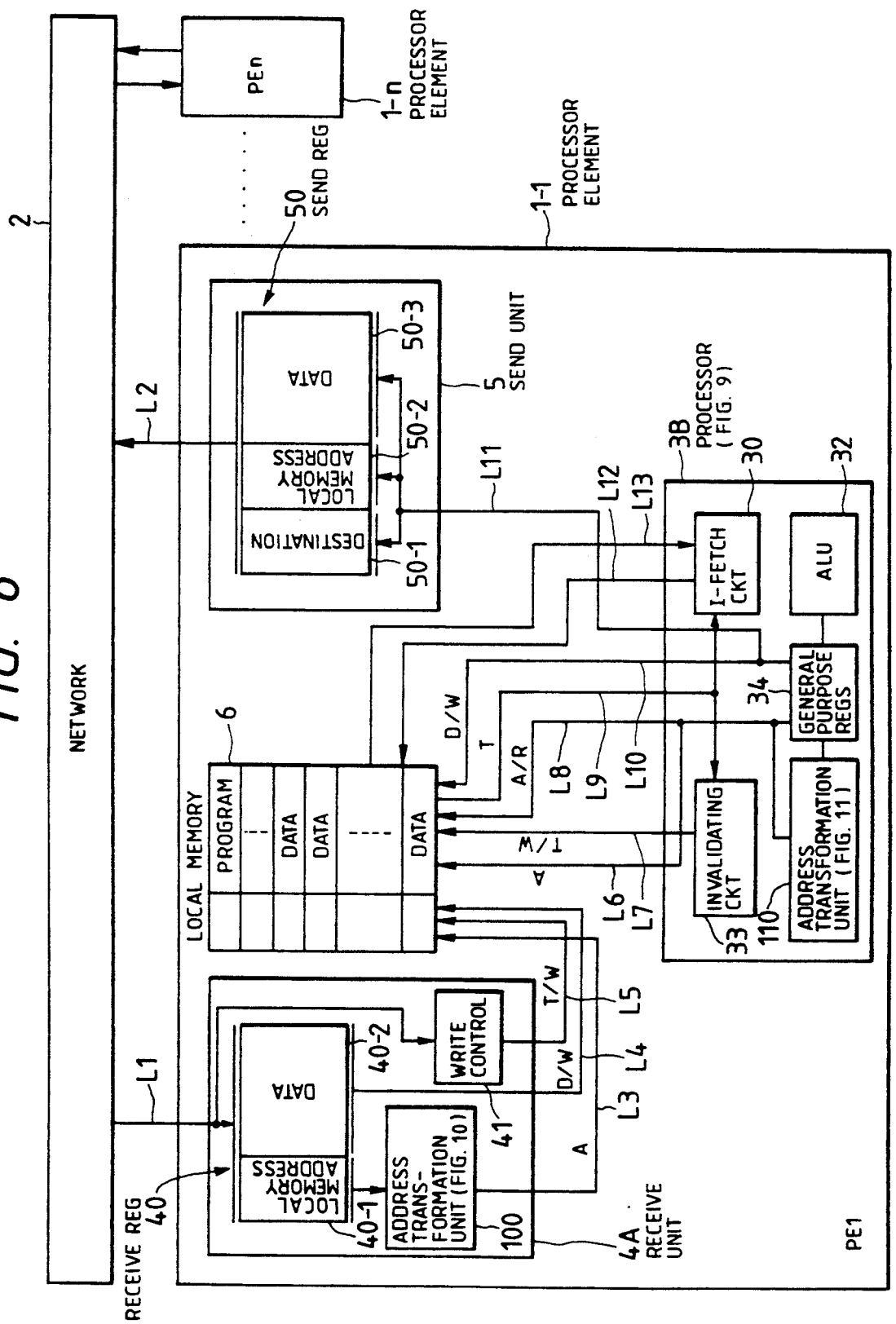
FIG. 8 is a schematic block diagram of a parallel computer according to a third preferred embodiment of the invention.

FIG. 8 indicates a parallel computer according to a third preferred embodiment of the invention. The parallel computer according to the third preferred embodiment corresponds to a modified parallel computer of the first preferred embodiment. The same reference numerals employed in FIG. 8 denote the same circuit elements shown in FIG. 1. A difference between the parallel computers shown in FIGS. 1 and 8 is as follows. That is, in the receive unit 4A of the respective processor units, an address transform unit 100 is employed for transforming a virtual received memory address 40-1 as the data identifier into the address in the local memory 6A, whereas another address transform unit 110 is employed for transforming a vertical receive memory address as the data identifier into the address of the local memory.

Figure 12:
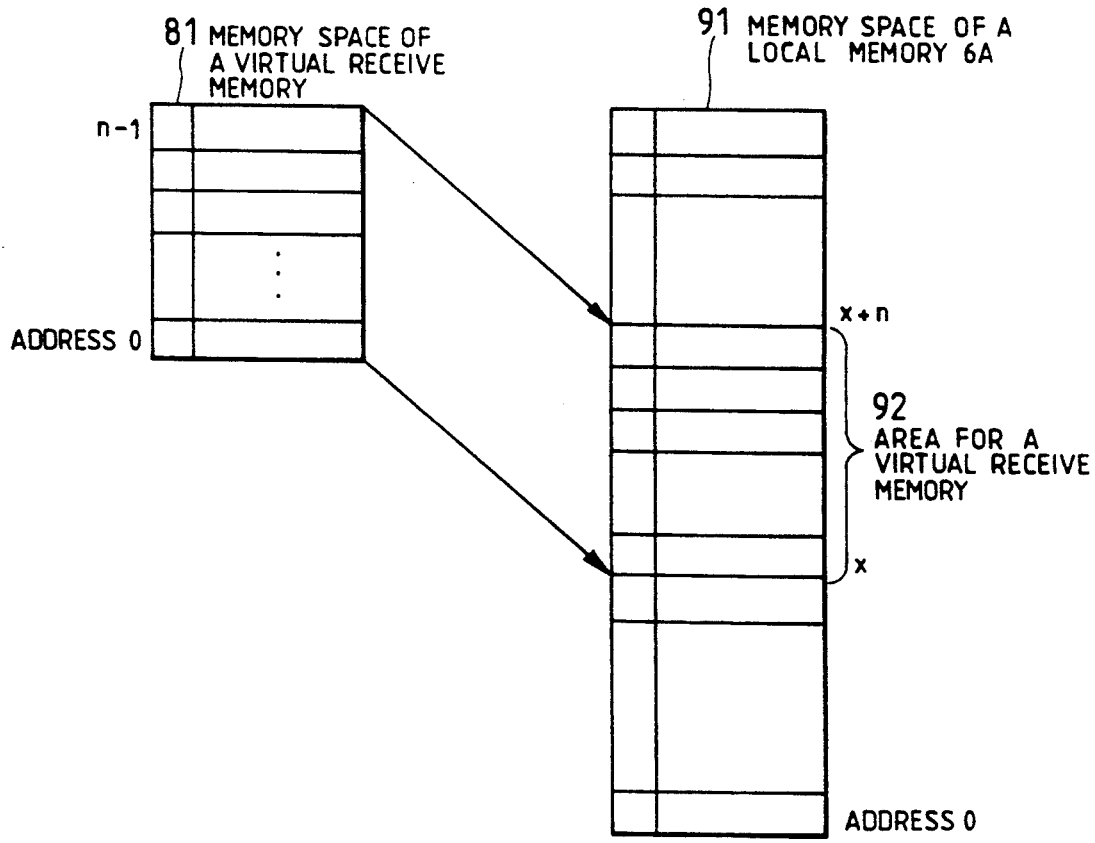
FIG. 12 shows a relationship between two memory spaces employed in the parallel computer according to the third preferred embodiment.

According to the third preferred embodiment, the advantage achieved in the second preferred embodiment can be realized by slightly modifying the parallel computer of the first preferred embodiment. The specific feature of the second preferred embodiment is caused by separating the memory space produced by the receive memory 8(FIG. 5) from the memory space generated by the local memory 6A. To divide the space, the memory itself may be divided as described in the second preferred embodiment. However, the space division can be achieved according to another different method of the third preferred embodiment. That is to say, as illustrated in FIG. 12, a memory space 81 of a vertual receive memory is mapped into the receive memory area 92 of the memory space 91 of the local memory 6A. When the receive memory area 92 is located within a range from the address x to $(X+n-1)$, the received address is transformed into the address larger than it by "x". With regard to the computer architecture, the separate spaces are realized on the same memory of the hardware.

Figure 10:
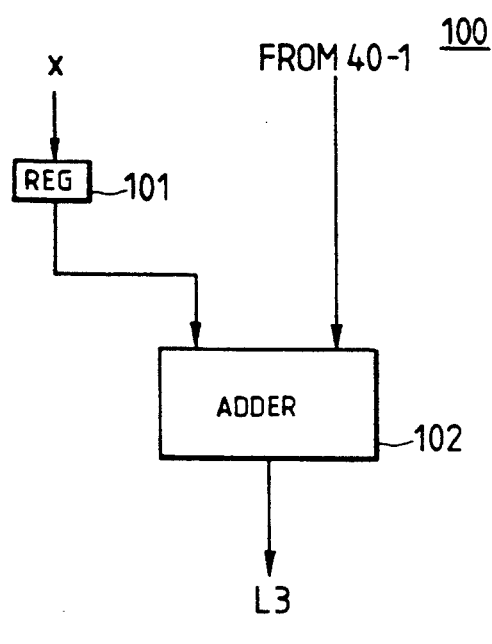
FIG. 10 is a schematic block diagram of the address converting circuit employed in the parallel computer shown in FIG. 8.
Figure 11:
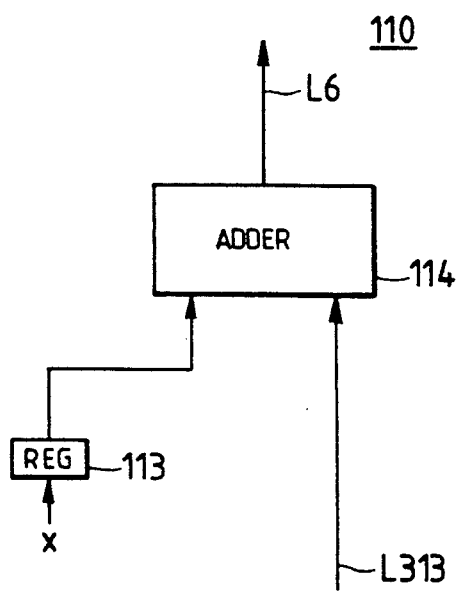
FIG. 11 is a schematic block diagram of another address converting circuit (110) employed in the parallel computer according to the third preferred embodiment.

The address transform unit 100 is arranged by, as shown in FIG. 10, an adder 102 for adding the received address 40-1 to the above-described constant value. Setting the value of x to the register 101 may be performed by, for instance, the processor 3B shown in FIG. 8 (a line required for this purpose is omitted in the drawing). As illustrated in FIG. 11, the address transform unit 110 is constructed by an adder 114 for adding the above-described constant value "x" to the address on the line L313 read from the general-purpose register 134 (will be discussed later). Setting the value to the register 113 may be performed similar to that of the register 101.

Figure 9:
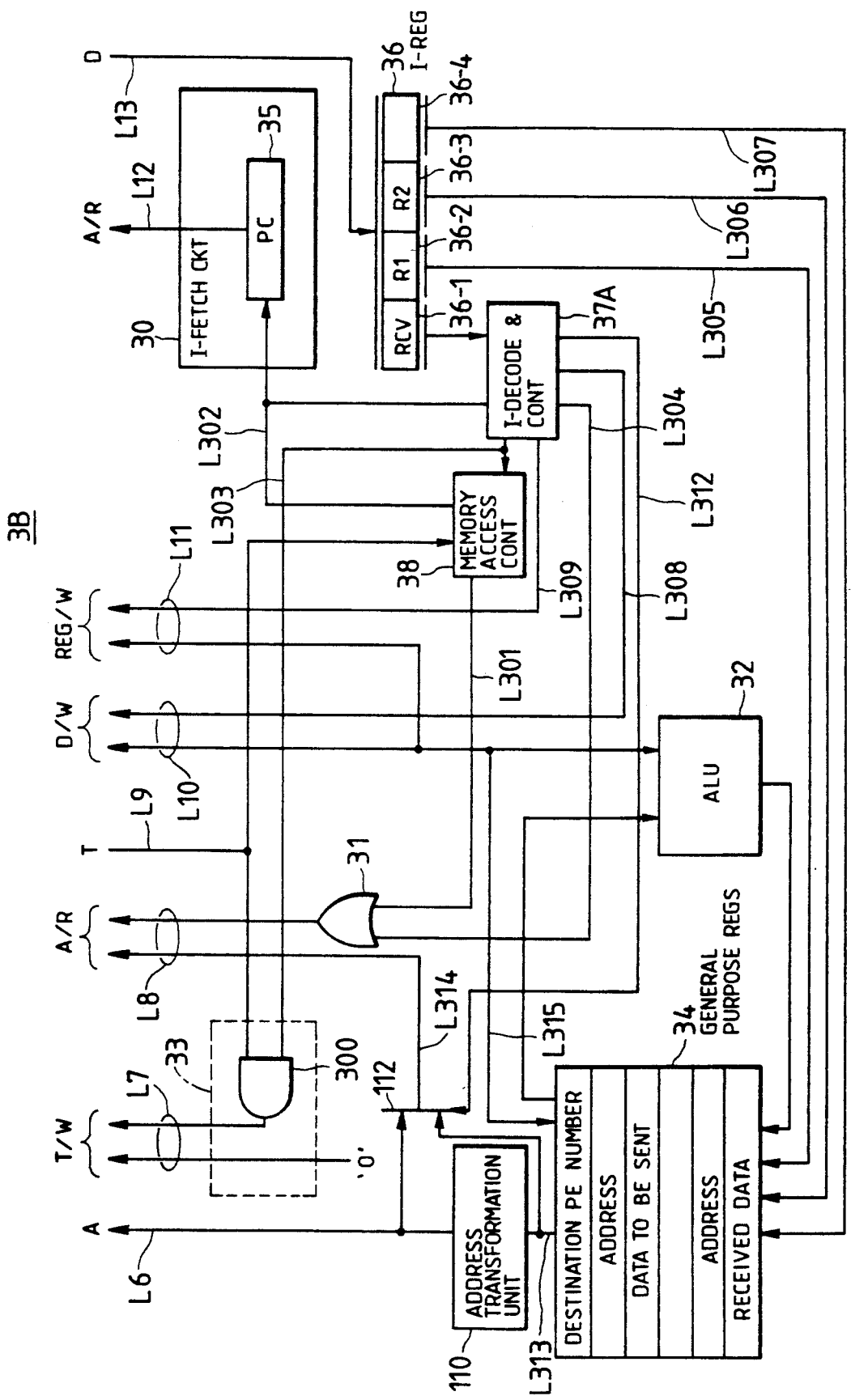
FIG. 9 is a detailed circuit diagram of the processor employed in the parallel computer shown in FIG. 8.

FIG. 9 illustrates a circuit arrangement of a processor 3B. In FIG. 9, the same reference numerals shown in this figure indicate those of FIG. 2. A different point of the processor shown in FIG. 9 from that of FIG. 2, is such that in addition to the unit 110, a selector 112 is employed so as to select the output L313 of the general-purpose register and the output of the address transform unit 110, and the instruction decoding controller 37A outputs a signal L312 for selecting the selector 112 during the RECEIVE instruction decoding operation, in addition to the function of the instruction decoding controller 37 shown in FIG. 2.

When this signal L312 is not output, this selector 112 continuously transfers the line L313 to the line 314.

An operation of the processor shown in FIG. 8 has the following different point as compared with that shown in FIG. 1. That is, when the SEND instruction (FIG. 4) is executed, the virtual receive memory address functioning as the data identifier, which has been determined with respect to the data to be sent, is previously stored into the general-purpose register having the register number R2. The same data transmission operation after the SEND instruction is accomplished is performed as that of FIG. 1.

In the transmitted data receive unit 4A, the received virtual receive memory address 40-1 is transformed into the local memory address by the address transform unit 100. The received data together with the tag having a value of 1 is written into the local memory 6 by utilizing this transformed address. After the SEND instruction is completed, in the register number R1 designated by this instruction (FIG. 5), the virtual receive memory this instruction is performed, as explained in FIG. 1, this address is output on the line L313. In the third preferred embodiment, this address is transformed into the corresponding local memory address by the address transform unit 110. The selector will select the transformed address in response to the signal on the line L312, and then will send it to the local memory 6. The subsequent operation is the same as that shown in FIG. 1.

Then, a description will now be made to the newly introduced RECEIVE instruction. This RECEIVE instruction has the same format as that of the first preferred embodiment, and similarly has the same operand. When this instruction is executed, the parallel computer according to the third preferred embodiment will be operated as follows.

That is to say, the instruction decoding controller 37 of the processor 11 firstly outputs the contents of the fields 36-2 and 36-3 of the instruction register 36 to the general-purpose register group 34 via the respective lines L305 and L306, and also outputs via the line L303 a signal impling that the RECEIVE instruction is executed so as to initialize the memory access circuit 38. As a result, the first operand as the memory address is output via the line operand as the memory address is output via the line L313 address transform 110 and selector 112 to the line L314. A memory rear demand signal generated by the memory access circuit 38 together with the memory read demand signal sent via the line L301 and OR circuit 31 is output to the third port of the local memory 6. Accordingly, the local memory 6 outputs the value of the tag to the line L9 and also the data to the line L10. The data output to the line L10 is set to the general-purpose register designated by the second operand. The value of the tag output to the line L9 is input into the memory access circuit 38. When the value of this tag is equal to "0", the memory access circuit 38 again generates the memory read demand signal to the line L301, whereby the above-described memory access operation is repeated. When the value of the tag output to the line L9 is equal to "1", the output of the AND circuit 300 in the invalidating circuit 33 becomes "1". As a consequence, since the first operand output via the line L313, and address transform unit 110 to the line L6 is used as the address for the identifier, both the value "0" output to the line L7 and the output of the AND circuit 300 are output to the second port of the local memory 6 as the tag write data and also tag write demand signal, the tag of the word designated by the first operand becomes "0". When the tag on the line L9 is equal to "1", the memory access circuit 38 accordingly supplies a signal to the program counter 35 from the line L302, so as to update the content of the program counter 35. With the above-described series of the operation, the RECEIVE instruction is completed.

Figure 13:
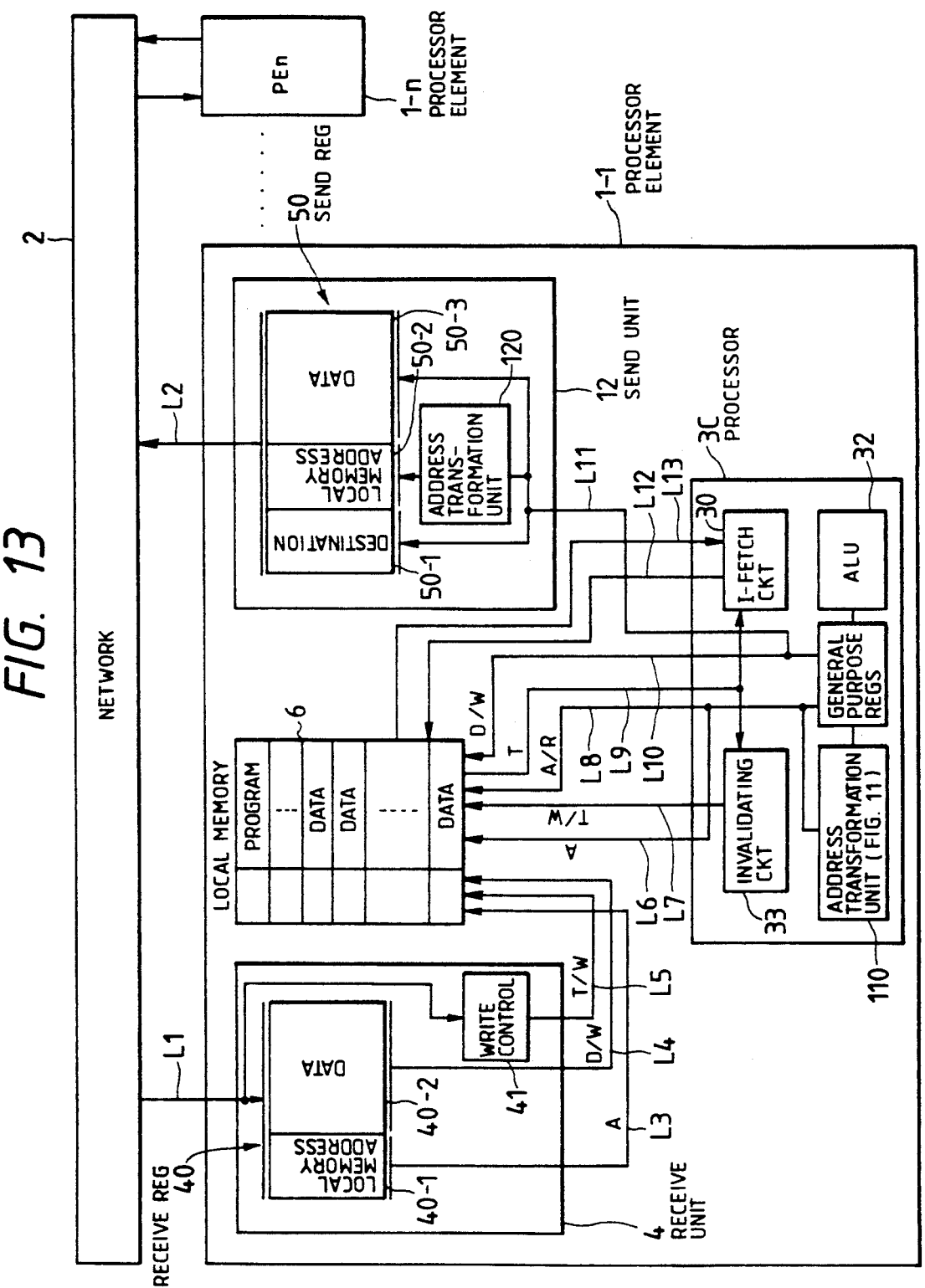
FIG. 13 is a schematic block diagram of an overall circuit arrangement of another parallel computer according to a third preferred embodiment.
Figure 14:
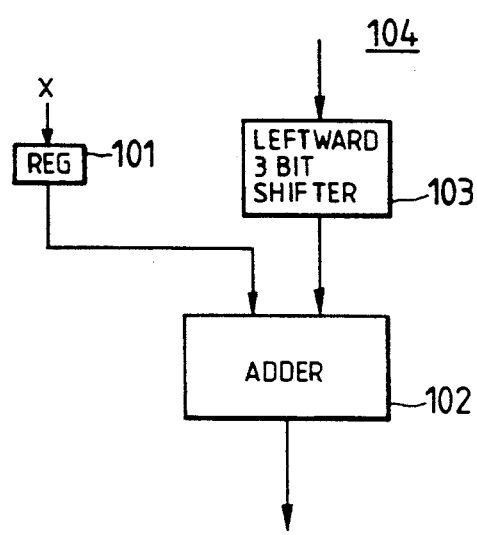
FIG. 14 is a schematic block diagram of the address converting circuit (104) employed in the parallel computer according to the fourth preferred embodiment.

In the above-described preferred embodiment, the address transformation executed in conjunction with the SEND instruction execution was performed in the address transform unit 100 within the receive unit 10 shown in FIG. 8. However, this address transformation may be performed until the value is actually written into the local memory after the SEND instruction has been accomplished. As a consequence, as shown in FIG. 13, an address transform unit 120 may be provided within the send unit 12, where the same circuit arrangement of the address transform unit 110 shown in FIG. 8 is employed.

In the above-described embodiment, the method for adding a constant value of "x" has been described as the mapping method. The present invention is not limited to this mapping method. For instance, such a mapping method may be employed such that the address of the local memory can be determined only from the address of the receive memory space, and also there is no double positionings.

Also when the data is written into the local memory of the other processor element under the SEND instruction, the local data is not destructed by the other processor element due to an error in the program, if the data write operation to the area other than the receive memory area 92 is not performed. For instance, when the memory capacity of the receive memory area 92 is selected to be "n" words, the complier may confirm that the address of the virtual receive memory as the instruction of the second operand is less than the "n" address when the SEND instruction is performed. If this address is large than the "n" address, the data write operation is suppressed. Otherwise, it may e confirmed that after either the address transform unit 100 (FIG. 8) or the address transform 20 (FIG. 13) is executed, the transformed address is larger than the "X" address and less than the (x+n) address.

According to the parallel computer of the third preferred embodiment, there are the same advantages as in the second preferred embodiment in addition to the following merit. That is to say, since in memory 8 and local memory 6A are separated from each other in the hard ware, when the large scale calculation is performed and the memory capacity of the local memory 6A becomes shortage, this calculation cannot be performed even if there is sufficient memory capacity in the receive memory 8. In the converse memory capacity case, such a large scale calculation cannot be performed. However, according to the third preferred embodiment, if there is a sufficient memory space in the receive memory, this memory space may be utilized as that of the local memory. In other words, if a summation between the memory capacity of the receive memory 8 and that of the local memory according to the second preferred embodiment, is equal to that of the local memory 6A according to the third preferred embodiment, the parallel computer according to the third preferred embodiment can perform the large-scale calculation as compared with in the second preferred embodiment.

Parallel Computer According to a Fourth Preferred Embodiment

Figure 16:
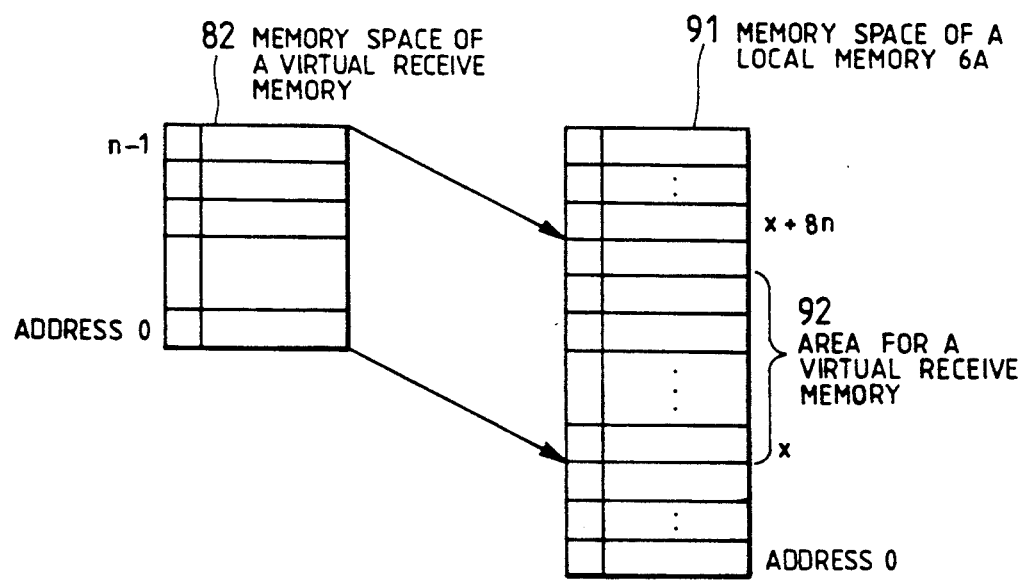
FIG. 16 illustrates a relationship between two memory spaces employed in the parallel computer according to the fourth preferred embodiment.

It should be noted that a parallel computer according to a fourth preferred embodiment is constructed by modifying that of the third preferred embodiment. In the parallel computer according to the fourth preferred embodiment, the local memory 6 is addressed by a byte unit. If either the data read/written for the local memory 6, or the data transferred between the processor elements is larger than the address unit of the local memory 6, such as 8 bytes, the 1-bit tag is stored in the receive data storage of the local memory 6. Assuming that "n" pieces of the receive data are stored in the virtual receive memory area 92 (see FIG. 16) of the local memory 6, this area 92 is divided into "n" pieces of 8-byte areas, and then one piece of the received data is stored into the respective 8-byte areas. As a result, if the idea introduced in the parallel processor according to the third preferred embodiment is utilized, the following operations are conceived. That is to say, when the data is transferred between the processor elements, as the address attached to this data, an address difference "d" (relative address) calculated from a head address "a" of one of 8-byte areas within the virtual receive memory area 92, which has been previously determined with respect to this data, and also another head address "x" of the virtual receive memory area 92 (FIG. 16), is transferred, and then in the processor element at the data reception side, the received address difference "d" is added to the head address "x" so as to obtain the address "a" used for storing the data. However, if the data length is equal to 8 bytes, the lower 3 bits of the above-described address difference "d" are continuously "0" with respect to any data.

Figure 15:
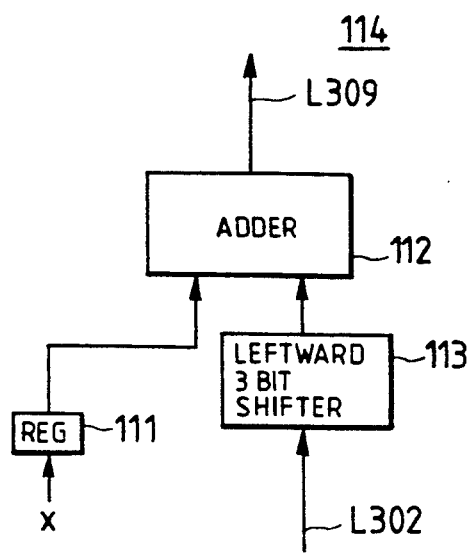
FIG. 15 is a schematic block diagram of another address converting circuit employed in the parallel computer according to the fourth preferred embodiment.

In the fourth preferred embodiment, the local memory of the processor element corresponds to a memory to which an address is attached as a word unit. Since the data having 1 byte unit such as character data must be processed in the practical parallel computer, there are many cases that the address is attached to the data as a byte (8 bits) unit. On the other hand, according to the normal numeral value data process, there are popular cases that the data calculation is carried out in either the unit of 4 bytes or 8 bytes. As a consequence, if the word is equal to 1 byte, and the tag is attached to every 1 byte, both the SEND instruction and RECEIVE instruction must be executed 8 times for each instruction in order to assure the reference order of, for instance, 8-byte data. This causes that not only a lengthy instruction execution is required, but also a large quantity of hardware is needed to prepare for attaching the tag to the data. To this end, in the parallel computer according to the fourth preferred embodiment, while the data within the processor element can be processed in 1 byte unit, the lower 3 bits of this data are not transferred, but these lower 3-bit data are regenerated in the processor element at the data reception side. As a consequence, a length of the packet to be communicated is shortened, and thus the amount of the data transmission is reduced, which eventually improves the data communication speed. Considering the virtual receive memory defined by the difference address (relative address) from which the lower 3-bit data have been deleted, it can be understood that to a memory space 82 of the virtual receive memory, an address is attached every 8 bytes data, and the address of this space is allocated to every 1 byte, which corresponds to the mapping of the local memory space 91. If the address of the virtual receive memory's space 82 is equal to "a", and the corresponding address of the local memory's space 91 is equal to "b", the mapping is carried out as follows: b=a×8+x. Where the value "x" is the same as the constant value "x" described in the third preferred embodiment, and therefore corresponds to the least significant address of the virtual receive memory area. In other words, the address except for the lower 3 bits corresponds to the data identifier representative of the order of the receive data storage area according to the fourth preferred embodiment. That is to say, when the SEND instruction is executed, the processor element at the data send side reads from the general-purpose register group 34, the address which is produced by deleting the lower 3 bits of the relative address determined by the data to be sent, and transfers this address as the packet together with the data. In the address transform unit 104 at the data reception side of the processor element, the received address is shifted by 3 bits in the left direction by means of a 3-bit left shift circuit 103, 3-bit "0" is added to the lower bit side, and the resultant data is added to a boundary address "x" in the register 101 by the adder 102 so as to produce the local memory address. In the processor element at the data reception side, when the RECEIVE instruction is executed, the address generated by deleting the lower 3 bits from the relative address is read from the general-purpose register group 34, and the local memory address is generated in the address transform unit 114 (FIG. 15).

Parallel Computer According a Fifth Preferred Embodiment

Figure 17:
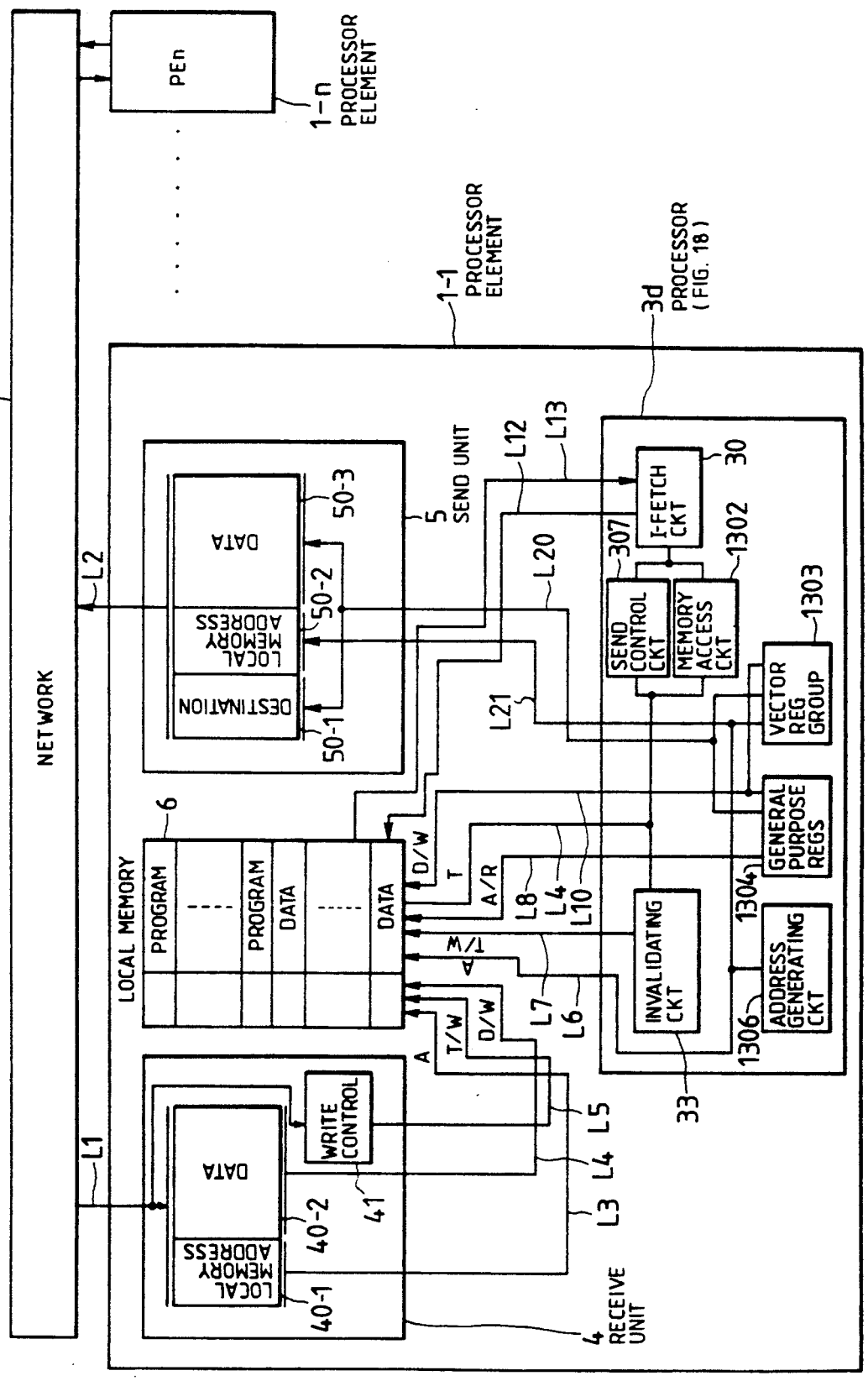
FIG. 17 is a schematic block diagram of an overall circuit arrangement of a parallel computer according to a fifth preferred embodiment of the invention.

A parallel computer according to a fifth preferred embodiment is shown in FIG. 17. The parallel computer of the fifth preferred embodiment is constructed by modifying that of the first preferred embodiment. It should be noted that same reference numerals employed in the parallel computer of the first preferred embodiment denote the same or similar circuit elements employed in FIG. 17.

Figure 18:
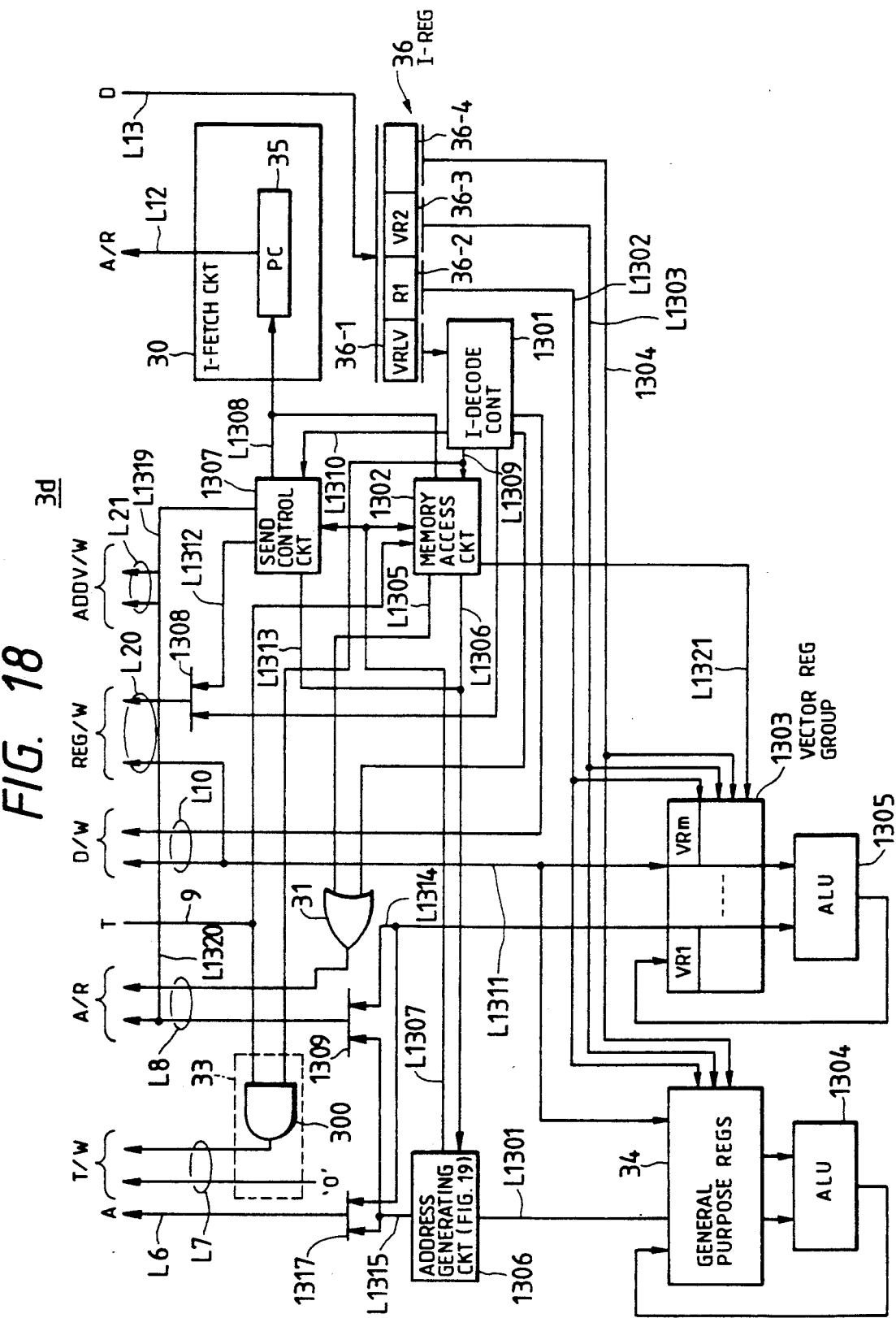
FIG. 18 is a detailed circuit diagram of the processor (3d) employed in the parallel computer according to the fifth preferred embodiment.

A detailed circuit of a processor 3d is shown in FIG. 18. In the processor shown in FIG. 18, reference numeral 1307 indicates a send control circuit which is used for performing a VSEND instruction (will be discussed later). Reference numeral 1302 denotes a memory access circuit which is used to execute a VRECEIVE instruction (will be discussed later). Reference numeral 1308 is a selector. Reference numerals 1309 and 1317 represent selectors, respectively. Reference numeral 34 denotes a general-purpose register group. Reference numeral 1303 indicates a vector register group. Reference numerals 1304 and 1305 are pipeline calculators.

Figure 19:
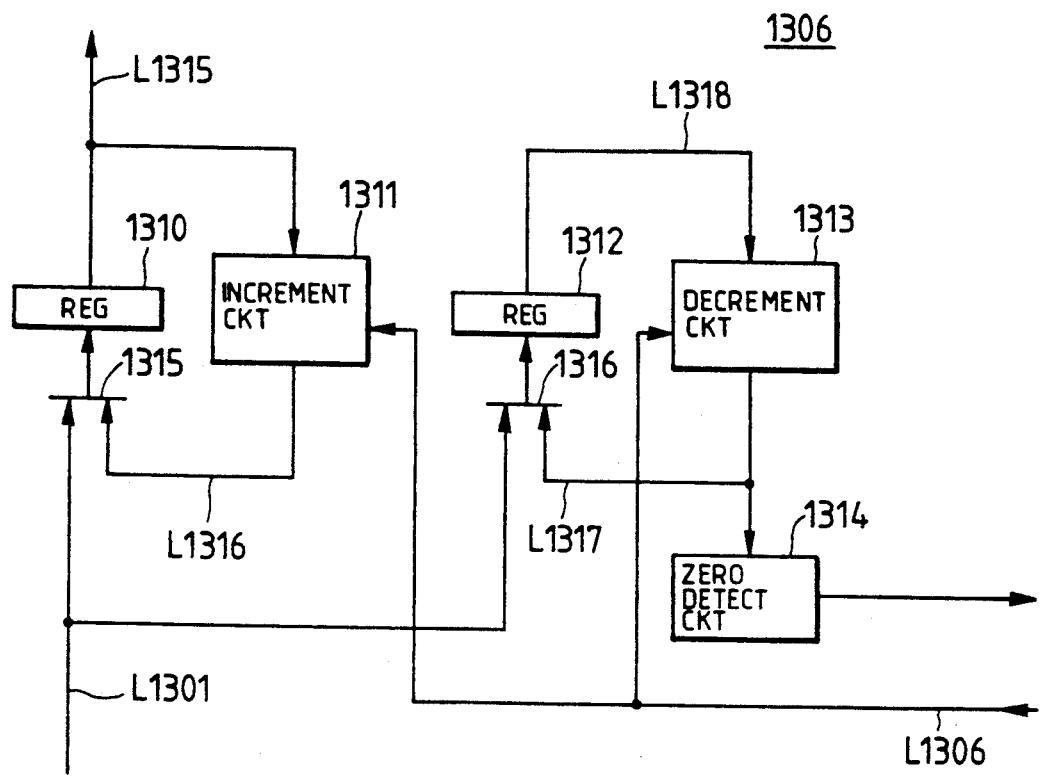
FIG. 19 is a circuit diagram of the address generating circuit (1306) employed in the parallel computer according to the fifth preferred embodiment.

The vector register group 1303 is constructed of a plurality of vector registers, and each of these vector registers is successively accessed in the order of the first element during the data read/write operations. Reference numeral 1306 is an address generating circuit, an internal circuit of which is shown in FIG. 19. In FIG. 19, reference numeral 1311 is an increment circuit, reference numeral 1313 is a decrement circuit, reference numeral 1314 denotes a zero detector circuit, and reference numerals 1315 and 1316 are selectors.

Although this processor 13 corresponds to a so-called "vector computer", it can execute a newly introduced instruction in addition to the instruction set of the normal vector computer (memory read for scalar data, memory write, memory read for calculation instruction and vector data, memory write, calculation instruction and so on). This newly introduced instruction will be described later.

Referring now to FIGS. 17 to 19, an operation of the processor element will be described.

An instruction decoding controller 1301 decodes a value of an instruction code stored in the field 36-1 among the instructions which have been set in the instruction register 36, distributes a signal for realizing an operation designated by this instruction into an internal circuit of the processor 3, and then operates the calculator 1304, calculator 1305, general-purpose register group 34 and vector register group 1303 and the like. When the operation designated by the instruction is accomplished, the instruction decode controller 1301 updates the value of the program counter 35 by the line L1308, and repeats the above-described series of the operation.

Subsequently, the newly introduced instruction will now be described.

Figure 20:
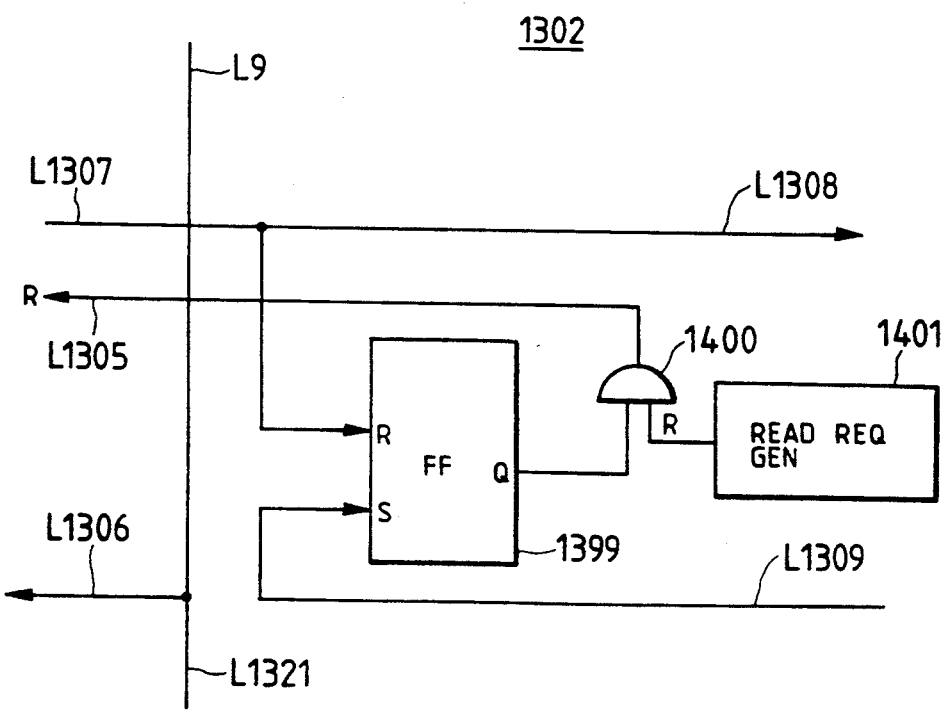
FIG. 20 is a circuit diagram of the memory access circuit (1302) employed in the processor shown in FIG. 18.

First of all, the VSEND instruction is described. This VSEND instruction is an instruction to write vector data of one processor element which has executed this instruction, into a local memory located within the other processor element. FIG. 20 illustrates a format of this VSEND instruction. The VSEND instruction has the following three operands.
1. destination
2. base address
3. vector data.

Each of these operands has been stored into a general-purpose register designated by the instruction of R1, into a general-purpose register designated by the instruction format of R2, and into a vector register designated by a VR3 field. This instruction implies that the vector data designated by the third operand is written into a continuous region starting from the address designated by the second operand, of the local memory of the processor element designated by the first operand. It should be noted that the number of the elements of the vector data has previously been stored into the specific general-purpose register group 34 in response to the other different instruction.

When executing the VSEND instruction, the parallel computer according to the fifth preferred embodiment is operated as follows.

First of all, the instruction decoding controller 1301 of the processor 13 outputs the values (register number) of the fields 36-2 and 36-3 of the instruction register 36 to the general-purpose register group 34 via the respective lines L1302 and L1303, and also outputs to the vector register group 1303 the value (vector register number) stored into the field 36-4 via the line L1304. Also this controller transfers a signal impling that the VSEND instruction is executed to the send control circuit 1307 via the line L1310 so as to initialize this send control circuit 1307. As a result, the write demand signal for the register generated by the send control circuit 1307 via the line L1312 and selector 1308 together with the first operand as the line L20 is output and set to the field 50-1 of the register 50 of the send unit 5. The second operand is stored via the line L1301 and selector 1315 to the register 1310, and the element number of the vector data is stored into the register 1312 via the line L1301 and selector 1316.

Subsequently, the following operations will be repeated.

First, the content of the register 1310 in the address generating circuit 1306 is output via the line L1315 and selector 1309 to the line L1320, and also the write demand signal generated by the send control circuit 1307 is output to the line L1319, and thus this is represented and transferred to the send unit 5 as the line L21 and then set in the field 50-2. In conjunction with this operation, the element of the vector register designated by the third operand is read on the line L1311 so that it is transferred as the line L20 to the send unit 5 together with the write signal which is generated by the send control circuit 1307 and output via the line L1312 to the selector 1308. Thereafter it is set in the field 50-3. Subsequently, the send control circuit 1307 sends a signal via the lines L1313 and L1306 to the increment circuit 1311 and decrement circuit 1313 within the address generating circuit 1306, whereby the contents of these registers 1310 and 1312 are increased by 1, and decreased by 1, respectively. At this time, the zero detecting circuit 1314 sends a signal to the send control circuit 1307 via the line L1307 if the resultant value calculated by decreasing the content of the register 1312 by 1 becomes "0".

In the send unit 5, every time the value is set into the register 50, the content of the register 50 is sent to the processor element designated by the content of the field 50-1 via the network. The operations after this value transmission are performed in the same manner as in the first preferred embodiment.

Since the element number of the vector number has been set in the register 1312 at the beginning of the instruction execution stage, the above-described operations are repeated at the same times as the element number. Thereafter, the signal is sent via the line L1307 to the send control circuit 1307. Upon receipt of this signal, the send content of the program counter on the line L1308. As previously described, the operations of the VSEND instruction have been completed.

Then, the VRECEIVE instruction will be described.

This VRECEIVE instruction is an instruction to read out valid data from the local memory of the processor element where this instruction is performed, and to store the read data into the vector register. FIG. 21 shows a format of the VRECEIVE instruction. The VRECEIVE instruction has the following two operands.

1. base address
2. vector register number.

Each of these operands has been stored into a general-purpose register designated by the instruction format of R1, and into a VR2 field. This instruction implies that the valid data written into a continuous region starting from the address designated by the first operand is sequentially read, and then stored in the vector register designated by the second operand. It should be noted that the number of the elements of the vector data has previously been stored into the specific general-purpose register group 34 in response to the other different instruction.

When executing the VRECEIVE instruction, the parallel computer according to the fifth preferred embodiment is operated as follows.

First of all, the instruction decoding controller 1301 of the processor 13 outputs the values (register numbers) which have been stored into the field 36-2 of the instruction register group 34 via the line, and also outputs the values (vector register numbers) which have been stored via the line L1303 to the vector register group 1303. Also it sends a signal impling that the VRECEIVE instruction is executed to the memory access circuit 1302 via the line L1309 so as to initialize this memory access circuit 1302. On the other hand, the first operand is sent via the line L1301 and selector 1315 and stored into the register 1310. The element number of the vector data is sent via the line L1301 and selector 1316 to the register 1312.

Subsequently, the following operations will be repeated.

First, the content of the register 1310 in the address generating circuit 1306 is output via the line L1315 from selector 1309, and also the read demand signal generated by the memory access circuit 1302 is output to the line L1305 from the OR circuit 31 and this output is transferred to the third port of the local memory 6, as the line L8. As a consequence, the local memory 6 outputs the value of the tag on the line L9, and the data on the line L10. The tag output on the line L9 is input into the memory access circuit 1302. When this value is equal to "0", in the memory access circuit 1302, the flip-flop 1399 (FIG. 20) is not reset, and a newly generated read demand by the circuit 1401 is again output via an AND gate 1400 to the line L1305 so as to read the data stored in the local memory 6. When the value of the tag is equal to "1", this value is directly output on the lines L1321 and L1306, and thus, the vector register group writes the data into the vector register designated by the second operand. Upon receipt of the tag from the line L1306, in the address generating circuit 1306, the contents of the internal registers 1310 and 1312 are increased by the increment circuit 1311 to b 1, and decremented by the decrement circuit 1313 by 1, respectively. When the content of the register 1312 becomes "0" as a result of the decrement by 1, the zero detecting circuit 1314 announces to the memory access circuit 1302 via the line L1307. Since the value output to the line L9 becomes 1, and therefore the output of the AND circuit 300 within the invalidating circuit 33 becomes 1, both the value of "0" on the line L7 and the output from the AND circuit 300 are transferred as the tag write data and write demand signal to the second port of the local memory 6, as the address for the value output via the line L1315 and selector 1317 on the line L6, in conjunction with the operation of the memory access circuit 1302 shown therein. As a result, the tag of the word for addressing the value output on the line 6 becomes "0". It should be noted that this operation is so controlled to be effected prior to the increment of the content of the above-described register 1312.

Since the element number of the vector data has been set in the register 1312 at the beginning of the instruction execution stage, the above-described operations are repeated at the same times as the element number, and thereafter the signal is sent via the line L1307 to the memory access circuit 1302. In this memory access circuit 1302, the flip-flop 1399 is reset by the tag on the line L1307, the memory read demand is not longer sent to the line L1305, and thus a series of the memory access operation is completed. The tag on the line L1307 is transferred via the line L1308 to the program counter 35 so as to update the contents of the program counter 35. The above-described operations are the operation of the RECEIVE instruction.

Subsequently, a description is made to the operation of the parallel computer according to the fifth preferred embodiment. Each of the processor elements constituting the parallel computer of the fifth preferred embodiment is operated similar to the normal vector calculator, under the condition that the data is transferred between this processor element and the other processor element. When the data transmission between one processor element and the other processor element is needed, with respect to a region used for receiving the data (this region is previously determined by either a programmer or compiler) in the local memory of the processor element at the data reception side, the processor element at the data transmission side writes the data by the above-described VSEND instruction. This write operation can be realized in designing the program in such a manner that the processor element at the data reception side reads the data in response to the VRECEIVE instruction. With such an arrangement, the same advantage as that of the first preferred embodiment can be achieved and furthermore a high-speed data communication can be established as compared with the first preferred embodiment.

In the above-described parallel computer, the region of the local memory 6 accessed by the VSEND instruction and VRECEIVE instruction was the continuous region. If the program can be so designed the value to be increased by the increment circuit within the address generating circuit 1306 is programmed, it is possible to handle the data group equidistantly arranged on the local memory.

In order to furthermore introduce a freedom, the following VSENDL instruction and VRECEIVEL instruction may be employed.

FIG. 23A illustrates a format of this VSENDL instruction. The VSENDL instruction has the following three operands.
1. destination
2. address vector
3. vector data Each of these operands has been stored in the respective vector registers designated by the instruction formats R1, VR2 and VR3. This instruction implies that a j-th element of the vector of the third operand is written into an address designated by the j-th element (j=1, 2, ---, element number of vector data) of the vector of the second operand in the local memory of the processor element designated by the first operand. It should be noted that the element number of the vector data has been previously stored within the specific register among the general-purpose register group in response to another instruction.

This instruction can be executed in the substantially same manner as the above-described VSEND instruction. There are the following different points. That is, according to the previous VSEND instruction, as the value set into the field 50-2 of the register 50 in the send unit 5, a value generated from the address generating circuit 1306 is employed, and is set into the field 50-2 via the line L1315, selector 1309, line L1320 and line L21. To the contrary, according to this VSENDL instruction, the vector register within the vector register group 1303 previously designated by the contents of the field 36-3 in the instruction register 36 is selected via the line L1303, and then the content of this vector register is set into the field 50-2 via the line L1314, selector 1309, line L1320 and L21.

Subsequently, a format of the VRECEIVE instruction is illustrated in FIG. 23B. This VRECEIVE instruction has the following two operands:
1. address spectrum
2. vector register number.

Each of the operands is present in the vector register and VR field designated by the VR1 field of the instruction format. This instruction implies that the valid data is read from the address designated by a j-th element (j=1, 2, ---, element number of vector data) of the vector of the first operand, and written into a j-th element of the vector register of the second operand. It should be noted that the element number of the vector data has previously been stored in the specific register within the general-purpose group in response to another instruction.

Although this instruction can be executed in the substantially same manner to that of the VRECEIVE instruction, there are different points as follows. In accordance with the VRECEIVE instruction, a value generated by the address generating circuit 1306 is employed as the read address for the local memory 6, and is transferred to the local memory 6 via the line L1315, selector 1309 and line L8. In contrast thereto, according to the VRECEIVE instruction, the vector register within the vector register group 1303 previously designated by the content of the field 36-2 in the instruction register 36 is selected, and the content of this vector register is sent to the local memory 6 via either the line L1315, selector 1317 and line L6, or line L1315, selector 1317 and line L6.

According to the parallel computer of the fifth preferred embodiment, a column of the address of the local memory 6 is previously set into the vector register within the vector register group, this is designated to the second operand of the VSENDL instruction, or the first operand of the VRECEIVEL instruction, so that an arbitrary data group arranged on the local memory 6 can be sent/received between the relevant processor elements with keeping the higher efficiency and assuring the reference order.

Parallel Computer According to a Sixth Preferred Embodiment

Figure 24:
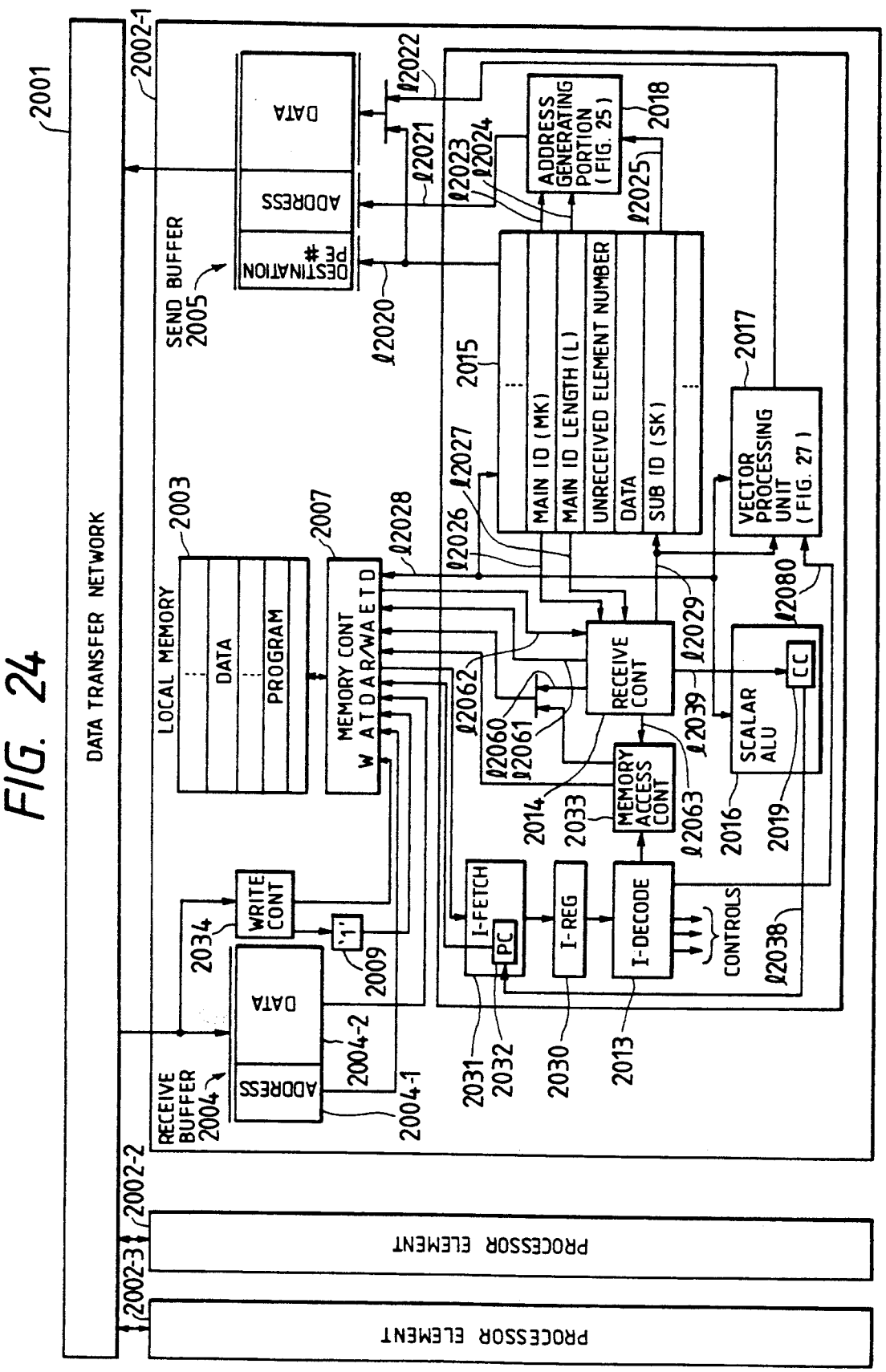
FIG. 24 is a schematic diagram of a parallel processor according to a sixth preferred embodiment of the invention.

Referring now to figures, a parallel computer according to a sixth preferred embodiment of the invention will be described. FIG. 24 is a schematic block diagram of an entire circuit arrangement of a parallel processor according to the sixth preferred embodiment.

In FIG. 24, reference numeral 2001 denotes a data transfer network between processor elements. Reference numerals 2002-1 to 2002-3 indicate processor element. An internal circuit arrangement of the respective processor elements is the same as each other. Reference numeral 2003 is a local memory in the processor element. Reference numeral 2004 indicates a receive unit, reference numeral 2005 denotes a send buffer, reference numeral 2006 indicates an instruction process unit, reference numeral 2007 denotes a memory controller, reference numeral 2013 indicates an instruction controller, reference numeral 2014 is a receive controller, reference numeral 2015 is a general-purpose register, reference numeral 2016 indicates a scalar calculator, reference numeral 2017 represents a vector processing unit, reference numeral 2030 represents an instruction register and reference numeral 2013 denotes an instruction register. Further, reference numeral 2003 is a program counter PC.

The function of the local memory 2003 is to stored either a program, or data therein, which includes a tag unit for storing 1-bit tag every word unit (1 word corresponds to 4 bytes in the preferred embodiment). This tag unit is newly introduced so as to perform the parallel computer according to the present invention.

As instruction fetch 2031 sequentially reads instruction addresses denoted by the program counter 2032 of the local memory 2003 to the instruction register 2030, and the read instruction is decoded in the instruction decoding unit 2013. In case that the read instruction designates any of the general-purpose register group 2015, the designated register number is supplied thereto, otherwise the calculating units 2016 and 2017 are controlled in such a manner that the calculation is carried out, which is designated by the read instruction. As illustrated in detail in FIG. 27, the vector process unit 2017 is constructed of a vector calculator 2017 and a vector register group 2070.

In FIG. 24, only three pieces of the processor elements are illustrated. It is apparent that any number of the processor elements may be employed. The function of the data transfer network between the processor elements is to transfer a message to the processor element having the PE number to which this message is sent. As this data transfer network 2001 between the processor elements, a cross bar switch, multi-stage switch network or bus may be utilized.

First, data transfer process will now be described. An instruction for demanding the message transfer si so-called as "a send instruction". The formats of this instruction are as follows, i.e., SEND GR1, GR2, GR3 and GR4. SEND implies an ope-code, GR1 to GR4 denote numbers of the general-purpose registers for storing the data to be sent, the main identifier MK and sub-identifier SK for the data to be sent, and the destination processor element number. Moreover, in the general-purpose register named by "(GR2)+1" number, a length of the main identifier MK has been previously held.

When this send instruction is read by the instruction fetch circuit 2031 and set in the instruction register 2030, the instruction decoding unit 2013 decodes the instruction, and transfers the destination processor element number and transfer data corresponding to the contents of the general-purpose register via the line 1 2020 to the send buffer 2005. In addition, the main identifier MK, sub-identifier SK and a length "L" of the main identifier corresponding to the contents of the general-purpose register are sent to the address generating unit 2018. This address generating unit 2018 generates the address of the local memory in the processor element at the data transmission side based upon three pieces of the input information, and transfers this address via the line 1 2021.

Figure 25:
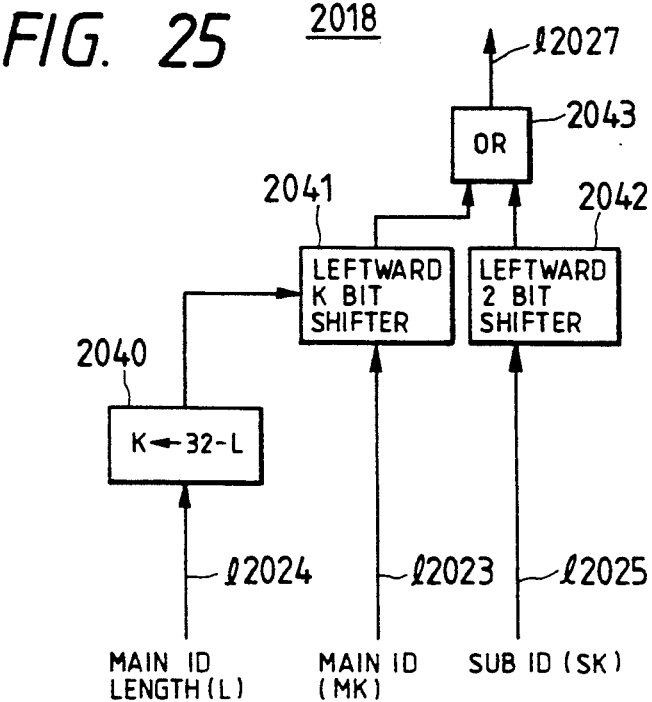
FIG. 25 is a detailed circuit arrangement of the address generating unit shown in FIG. 24.

This address generating unit 2018 according to a preferred embodiment is illustrated in FIG. 25. The input main identifier's length "L" becomes via a subtracting circuit 2040 shift count information of a left shifter 2041, so as to shift the main identifier MK by (32-L) bits to the left direction (in this embodiment it is assumed that the address space of the local memory is 32 bits). Furthermore, this resultant value is OR-gated in an OR gate 2043 with another resultant value obtained by shifting the sub-identifier SK by 2 bits in the shifter 2042 in the left direction, and the OR-gated value is then set as the address of the local memory of the processor element at the data reception side, via the line L 2021, into the send buffer 2005.

Referring back to FIG. 24, the message generated by the send buffer 2005 is transferred to the data transfer network 2001, and then sent to the processor element having the destination PE (processor element) number within the message.

The feature of the fifth preferred embodiment is as follows. That is, the identifier for the data to be sent is arranged by the main identifier MK representative of the data group belonging to this data, and the sub-identifier SK for discriminating this data from other data in the data channel, and based upon this main identifier MK and sub-identifier SK, the address of the destinated local memory within the processor element at the data transmission side is generated. For instance, when the maximum value is found out from a large quantity of the data group, the above-described data group is subdivided into the respective processors, each of these processors detects the maximum value from the data group processed by the respective processors, and the maximum value data within the processor, which has been obtained by the respective processors, is transferred to one processor for retrieving the maximum value from all of the data groups.

At this time, the main identifier MK together with the data to be sent indicate that the transferred data are those for retrieving the maximum value, whereas the sub-identifier SK indicates the number of the data among the above data groups.

As another example, in case that the data to be sent is equal to one element in certain vector data, the main identifier MK represents the vector data belonging to the data to be sent, and the sub-identifier SK indicates the element number thereof within the vector data.

The format of the send instruction at this time is as follows: SEND, VR1, GR2, GR3 and GR4.

It should be noted that VR1 is a vector register number for holding the vector register number for holding the vector data to be transferred, GR2 indicates an identifier MK for the data, GR3 is an element number to be transferred within the vector data, and GR4 corresponds to a PE number of the destinated processor. Furthermore, a length of the identifier MK is previously held in the general-purpose register having the number of (GR2+1).

The data together with VR1 and GR3 are read from the vector register 2070 (FIG. 27) of the vector process unit 2017, and send via a line 12022 to the send buffer 2005. The transfer information other than this data is also sent from the general-purpose to a transfer buffer 2005. All of the vector data in the vector register can be transferred by repeatedly updating the content of the general-purpose register designated by GR3, i.e., the element number.

In case that the destinated PE number within the message in the data transfer network 2001 corresponds to PE2002-1, both the address and data constructed from the main identifier MK and sub-identifier SK within this message are held in the receive buffer 2004-1 and receive buffer 2004-2, respectively, and moreover initializes the write controller 2034. By this write controller 2007, the content of the register 2004 is sent to the memory controller 2007, the data of the register 2004-2 is stored into the address on the local memory representative of the register 2004-1. Furthermore, the write controller 2034 initializes a 1 generating circuit 2008, and sets the tag corresponding to the address in the storage into 1.

At this time, the memory controller 2007 exclusive-controls both the write controller 2031 for the local memory 2003, and the access demand by the memory access controller 2033.

The function of this memory controller 2007 is similar to that of the normal computer system. Also in the normal computer system, the exclusive-controls both the read/write access from CPU, and the read/write access from I/O. There are two different points:

(1). Only write demand is given from the write controller 2034.

(2). The tag is set/reset because of the tag having the word unit. As a consequence, one message has been transferred from one processor element to the other processor element.

The instruction for demanding the readout of this received data is so-called as "a received instruction". Also, the data read during the execution of this instruction is so-called as "received data" in the following description. In the fifth preferred embodiment, there are some received instructions. A format of one instruction is as follows: RECEIVE, GR1, GR2 and GR3. It should be noted that RECEIVE is an ope-code of this instruction, GR1, GR2, GR3 indicates a number of a general-purpose register for storing the received data, a number of a general-purpose register for holding a main identifier used for retrival operations, and a number of a general-purpose register for holding a length "L" of this main identifier, respectively. The sub-identifier SK which has been attached to the receive data is stored into the general-purpose register having a number of (GR1+1).

When this received instruction is read from the instruction fetch circuit 2031, set into the instruction register 2030, and furthermore decoded in the instruction decode 2013, both the main identifier MK and the length "L" of the main identifier MK of two general-purpose registers GR2 and GR3 designated by the receive instruction are sent via the lines 1 2026 and 1 2027 to the receive controller 2014 so as to initialize the receive controller 2014. Furthermore, the read demand for reading the received data from the local memory 2003 is generated from the memory access controller 2033.

The receive controller 2014 successively producing the address within the region at which the received data group arrives until the received data is generated based upon the receive two information, and retrieves whether or not the tag corresponding to the address on the local memory is valid.

In case that the received data has arrived (i.e., the corresponding tag becomes valid), the sub-identifier corresponding to the data is generated, and is stored in the general-purpose register designated by the receive instruction, via the line 1 2029 together with the data sent via the line 1 2028. Thereafter, the tag for the retrieved data of the local memory is subjected to be invalidated. Furthermore, a signal of "1" representative of the desired data is set in the condition code register 2019 in the scalar calculation 2016.

When no received data is present in the region at which the received data on the local memory arrives (i.e., all of the tags corresponding to the region where the received data arrive), another signal of "0" representing that the desired data could not be found out is set in the condition code register 2019.

Figure 26:
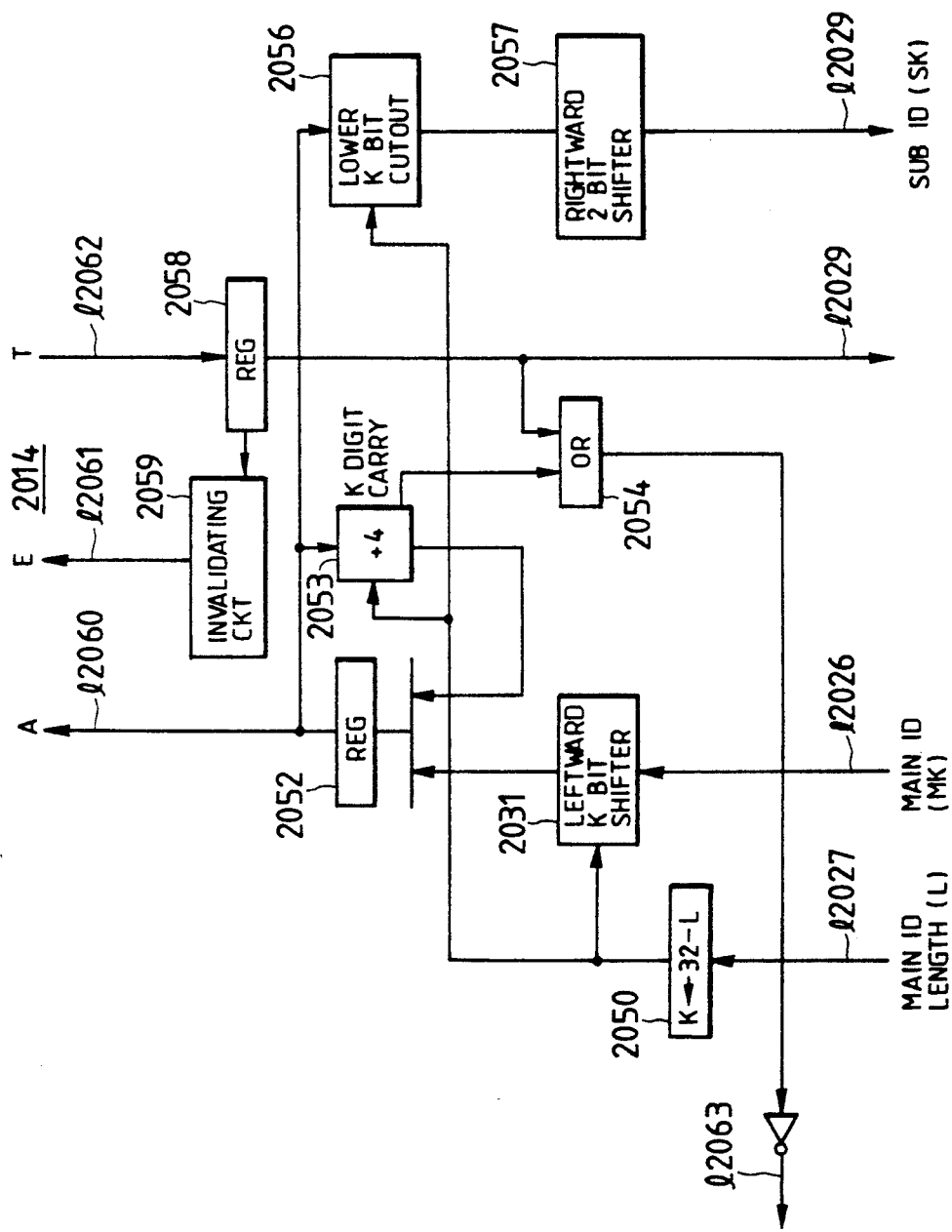
FIG. 26 is a detailed circuit arrangement of the reception control shown in FIG. 24.

FIG. 26 shows a circuit diagram of the receive controller 2014 according to a preferred embodiment. The main identifier length "L" sent via the line 1 2027 becomes a shift number of the shifter 2051 via the subtractor 2050. The main identifier MK sent from the line 1 2026 is shifted by (32-L) bits in the left direction at the shifter 2052. The content of this register 2052 is sent to the local memory via the line 2066 as the head address of the region where the received data group on the local memory is stored. Furthermore, this content is used to initialize the memory access controller 2033 (FIG. 24) via the line 1 2063. This memory access controller 2033 sends the read command to the local memory. The content of the register 2052 is added by +4 by a +4 adder 2053, and then supplied via the line 1 2060 to the local memory until either the received data is found out, or all of the regions into which the received data group on the local memory have been retrieved, and simultaneously the read demand is derived from the memory access controller 2033.

When the received data is found out, the corresponding tag information "1" is sent from the local memory 2003 (FIG. 24) via the line 1 2061 to the register 2058. When the tag information "1" is set in the register 2058, the invalidating circuit 2059 is initialized, and a tag invalidating signal is transferred, by which the tag corresponding to the address for reading the received data of the local memory 2003 (FIG. 24) is invalidated, i.e., "0". Furthermore, completion of the read demand is reported via the OR gate 2054 and line 1 2063 to the memory access controller 2033 (FIG. 24), and the condition code register cc 2019 (FIG. 24) is set via the line 1 2039. Then, a signal 2055 for invalidating the tag held in the register 2055 is sent via the line 12033 to the local memory. In addition, the received data is sent via the general-purpose register, the lower (32-L) bits of the address retrieved at this time are cut out, and further is shifted by 2 bits in the right direction in the shifter 2057, and thereafter is transferred as the sub-identifier SK via the line 1 2029 to the designated general-purpose register.

When all of the regions where the received data group is stored have been retrieved (namely, no send data has been found out), a judgement is made by the column increase of (32-L) column in the +4 adder circuit, completion of the read demand with respect to the memory access controller 2033 (FIG. 24) is announced via the OR gates 2054 and line 1 2031, and thereafter "0" is set in the condition code register cc 2019. That is, no received data has been found out.

Thus, one receive instruction has been executed.

After completion of this receive instruction, the instruction fetch 2031 reads out the well known "branch on condition instruction" from the memory 2003 in order to judge whether or not the data prepared for the subsequent instruction could be successfully received. Then, the instruction fetch 2031 performs the branch on condition instruction, and branches the above-described received instruction if the content of the condition code register 2019 is equal to "0". If the content of the condition code register 2019 is equal to 1, the instruction series succeeding this condition branch instruction is read from the memory 2003 and then executed. This instruction series contains the instruction series so as to calculate the received data. For instance, this condition corresponds to the data having the maximum value, i.e., the same main identifier which is retrieved from the data within the same group. The reason why both the received data and sub-identifier are received during the execution of the received instruction, is such that the sub-identifier SK is employed as the number for identifying the data having the maximum value.

The scalar instruction series for retrieving the maximum value will now be summarized. A determination is made that the number of one of the general-purpose register in the general-purpose register group 2015 is set to the maximum of GR4 storage, the other general-purpose register (this number is G5) is set to the sub-identifier storage having the maximum value thereof, and the initial values of these general-purpose registers are set to "0". As the receive instruction and the subsequent instruction of the branch on condition instruction, both the received data in the general-purpose register having the number GR4 are compared with each other in the scalar calculator 2016. Then, the instruction series is employed so as to execute such processes that the data having the larger value is stored into the general-purpose register having the number (GR1+1); both the sub-identifier SK for the received data in the general-purpose register having the number GR5 and one of the sub-identifiers SK for the general-purpose register having the GR5 are selected in response to the above-described comparison result and thereafter stored into the general-purpose register having the number GR5.

After this instruction series is performed, the total number of the received data is counted and a "branch on count register" is executed to perform the branch, depending upon the condition whether or not this total number has reached a predetermined element number. In other words, the required element number of the received data is previously stored in the general-purpose register having the number GR6, this element number is counted down by 1 during the instruction execution, and also if this value is not equal to 0, the control process is jumped into the instruction of the address previously stored in the general-purpose register designated by this instruction. Since this address is used as the address of the above-described receive instruction, the receive instruction is again executed in case that the received element number has not yet reached a predetermined element number of the desired received data.

As previously described, according to the above-described described receive instruction, a plurality of data designated by the main identifier MK from the local memory 2003 can be read out from the local memory irrelevant to the value of the sub-identifier SK, and the calculation for the data read by the receive instruction is carried out while the subsequent data are transferred from the data transfer network into the local memory 2003. Thus, according to the present preferred embodiment, the data can be read from the local memory and processed irrelevant to the difference in the sub-identifier SK.

Other receive instructions employed in the parallel computer according to the present preferred embodiment include formats of RECEIVE VR1, GR1, and GR3. It should be noted that the receive instructions GR2 and GR3 are the same as those of the instructions, i.e., the main identifier MK and the main identifier MK and the main identifier length 1 representing the length thereof. VR1 denotes the number of the vector register for storing the received data in response to this receive instruction. That is, this instruction implies that the main identifier MK reads from the local memory 2003, the coincident data by way of the receive controller 2014, and the read data is stored into the vector register having the number of VR1. In this time, the sub-identifier SK which has been attached to the data read out from the local memory 2003 is generated by the receive controller 2014 in the similar manner to the previous case, and is used for designating the data storage position within the vector register.

An operation of the apparatus during the execution of this instruction will now be described.

Figure 27:
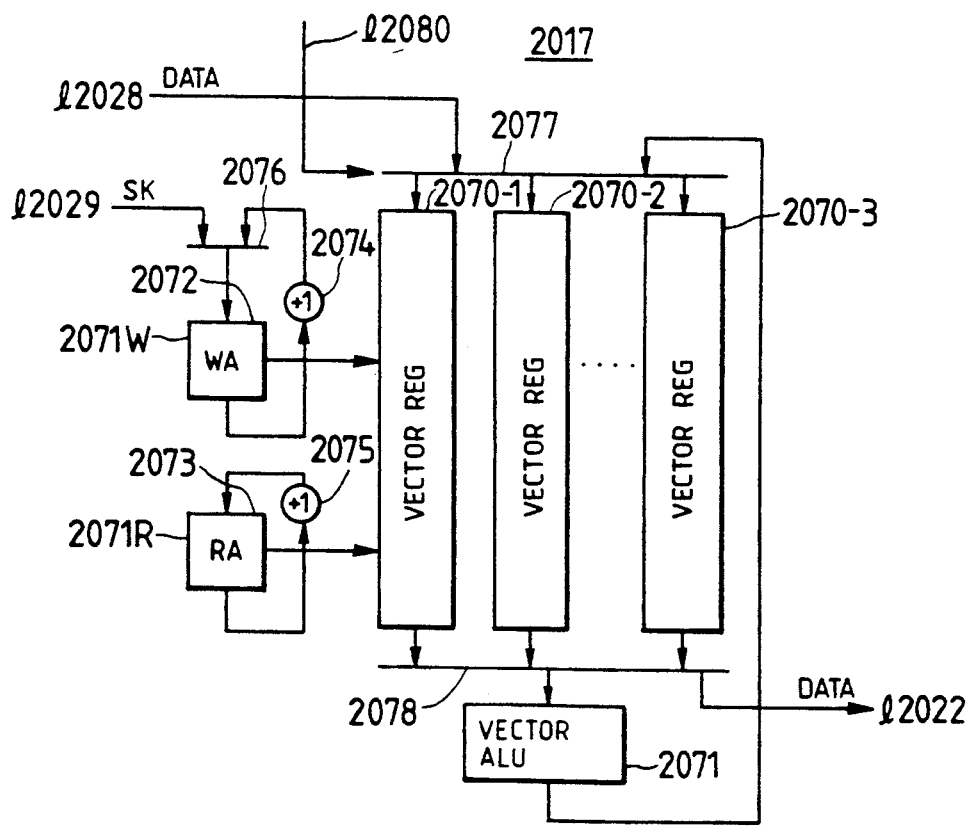
FIG. 27 is a detailed circuit arrangement of the vector process unit shown in FIG. 24.

When this instruction is stored into the instruction register 2030, the instruction controller 2013 sends the vector register number VR1 designated by this instruction via the line 1 2035 for the vector process purpose, and also both the main identifier MK and main identifier length "L" are sent from the general-purpose register group 2015 to the receive controller 2014, which is similar to the first receive instruction, in order to retrieve the local memory. When the data corresponding to the identifier MK is read out, this data and sub-identifier SK attached thereto are sent via the respective lines 1 2025 and 1 2027 to the vector process unit 2017. Referring now to FIG. 27, this vector process unit 2017 is constructed of the vector register group 2070, vector calculator 2071, local memory 2003 (FIG. 24), vector calculator 2071, selector 2077 for selecting the vector register into which the vector data supplied from the receive controller 2014 should be written, selector 2008 for selecting the vector register by which the vector data should be supplied to the vector calculator 2071, write circuit 2071 provided with the respective vector registers, and readout circuit 2071. In FIG. 27, there are shown only the write circuit 2071W and readout circuit 2071R for the vector register 2070-1. This write circuit 2071W is arranged by a WA register 2072 for holding the write address; +1 up-counter circuit 2074, and a selector 2006 for selecting an input from the line 1 2043 and an output from the +1 up-counter circuit 2074 so as to supply an output to a WAP register 2002. The readout circuit 2071R is constructed of an RA register 2073 for holding the readout address and a+1 up-counter circuit 2075 for counting up this value by +1.

When the above-described receive instruction is performed, the vector register number VR1 for designating this instruction supplied from the instruction executing controller 2013 (FIG. 24) via the line 1 2080 is input into the selector 2077, and the data read out from the receive controller 2014 (FIG. 24) on the line 1 2028 is sent to the vector register having the number of VR1. It is assumed that the vector register 2070-1 corresponds to the vector register having the number of VR1 instructed by the above-described receive instruction. At this time, the write circuit 2071W related to this vector register 2070-1 is initialized by an instruction decoding unit 2013, and simultaneously the selector 2076 selects the input supplied from the line 1 2043. As a result, the sub-identifier SK output from the receive controller 2014 to the line 1 2043 is set into the WA register 2072, so that the data supplied from the line 1 2044 is written into the memory device of the vector register 2070-1 corresponding to the sub-identifier SK. As apparent from the foregoing descriptions, the number which is allocated to the vector data as the main identifier MK is employed, and also the number which is allocated to the respective elements in this vector data as the sub-identifier SK is employed, so that the received data (vector element) can be written in one of the vector registers.

It should be noted that during the execution of the receive instruction, the fact whether or not there is data for changing the main identifier MK is reflected to the condition code register 2021 (FIG. 24) which is similar to the operation of the receive instruction, as described in the first description. Similarly, the operations where the branch on condition instruction is executed so as to change the above-described receive instruction, and the above-described receive instruction is again performed during a failure in the data reception, are the same as those in the execution of the receive instruction, as described in the beginning.

After the above-described receive instruction is executed, to judge whether or not the required vector element number has been received, the same branch on count instruction is employed and then the above-described reception instruction is carried out by necessary times.

As a consequence, the desired number of the vector elements can be stored into one vector register. Thereafter, by executing either one instruction by which the vector calculation instruction or vector data is stored into the memory 2003 (FIG. 24), or the other instruction by which the vector data is loaded from the memory 2003, the data process for the received vector data can be performed.

It is also possible that a receive instruction other than the above-described two types of the receive instructions may be performed. For instance, the data may be stored into either a general-purpose register or a register other than the vector register (e.g., a floating-point register not shown).

As is apparent from the above-described descriptions, the identifier (main identifier MK) attached to the respective data is employed in the sixth preferred embodiment, whereby a plurality of data belonging to this identifier can be fetched from the local memory. As a result, to this end, the idea according to the sixth preferred embodiment may be applied to such a case that no sub-identifier is attached to the data. In addition, if the main identifier length "L" is constant, there is no need that an identifier length L for a retrieval purpose is supplied from the process apparatus 2005 to the receive controller 2014. However, as in the present preferred invention, when the identifier length is designated, the same receive controller 2014 may be utilized in case of various main identifier length.

Parallel Computer According to a Seventh Preferred Embodiment

Figure 28:
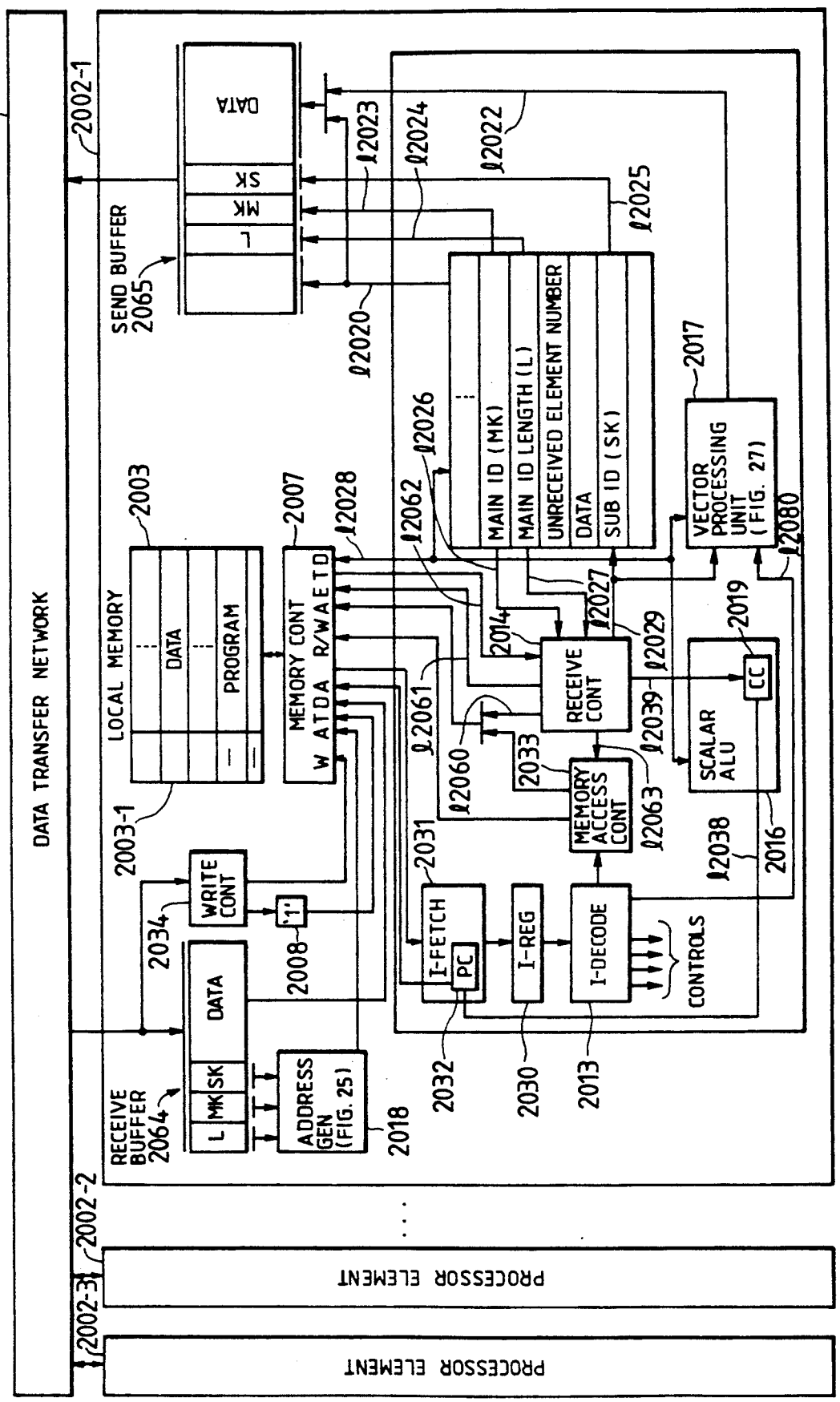
FIG. 28 is a schematic block diagram of a parallel processor according to a seventh preferred embodiment of the invention.

Referring now to FIG. 28, a parallel computer according to a seventh preferred embodiment of the invention will be described. It should be noted that the same reference numerals shown in the sixth preferred embodiment (FIG. 24) will be employed as those for denoting the same circuit elements shown in FIG. 28.

A different point between the sixth and seventh preferred embodiments is to employ an address generating unit 2018 in the processor element at the data reception side not in the processor element at the data transmission side.

In accordance with the parallel computer of the seventh preferred embodiment, a message 2063 is arranged by a destinated processor element number, a length "L" of a main identifier, a main identifier MK, a sub-identifier SK and data in the data transmission process.

This message is stored via a data transfer network 2001 into a receive buffer 2064 in a receive processor element. The main identifier length "L", main identifier MK and sub-identifier SK among the message stored into the receive buffer 2064 are transferred to the address generating unit 2018. In this address generating unit 2018, the write address of the receive data on the local memory is generated.

Parallel Computer According to an Eighth Preferred Embodiment

A parallel computer according to an eighth preferred embodiment of the invention will now be described with reference to FIG. 29.

Figure 29:
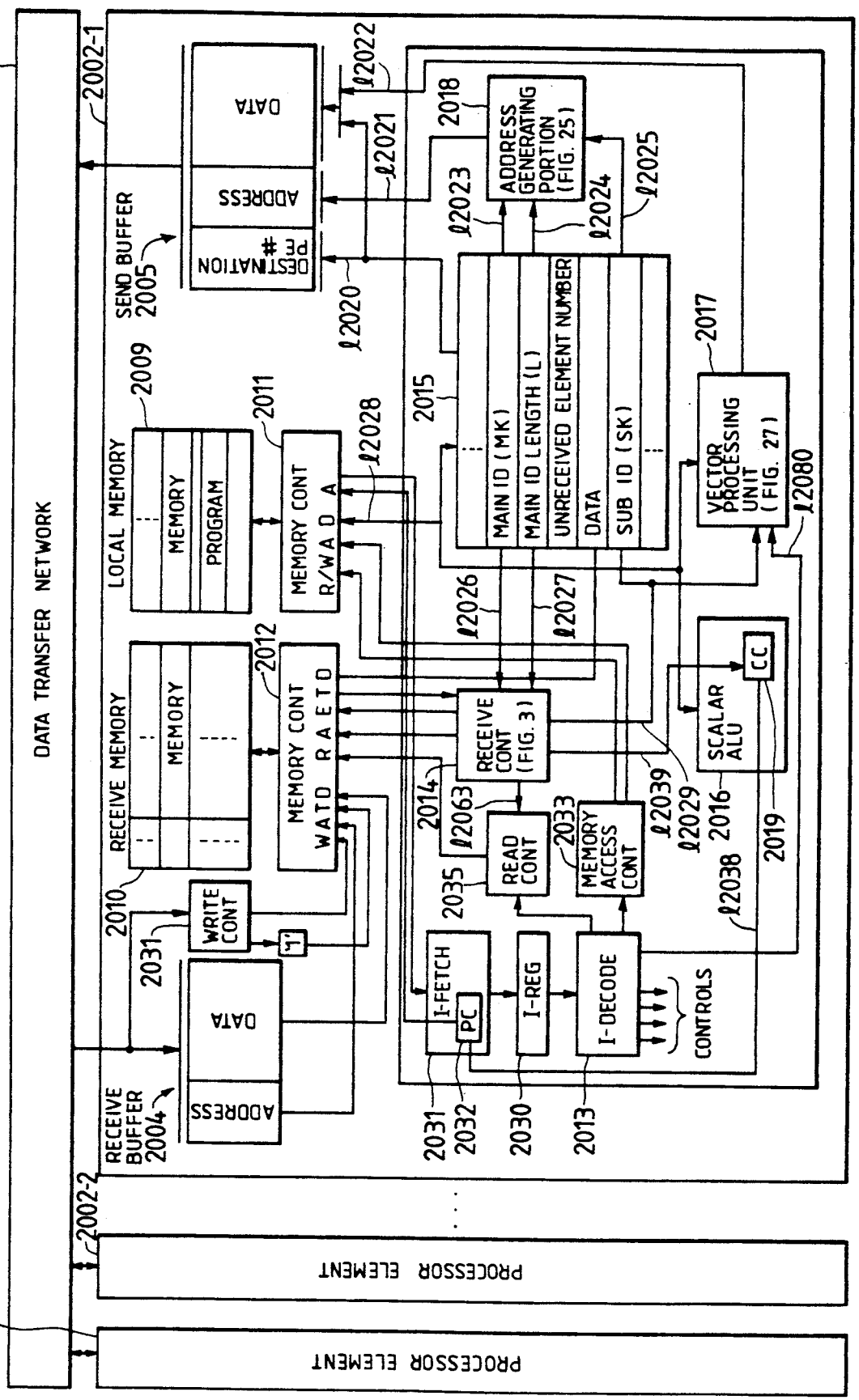
FIG. 29 is a schematic block diagram of a parallel processor according to an eighth preferred embodiment of the present invention.

It should be noted that the same reference numerals shown in the sixth preferred embodiment (FIG. 24) will be employed as those for indicating the same circuit elements shown in FIG. 29.

A different point between the sixth and eighth preferred embodiments is to employ a receive memory. In the parallel computer according to the eighth preferred embodiment, a receive memory having a tag is exclusively employed. In a local memory 2009, there is no tag.

With respect to the receive memory, both the write process from a receive buffer 2004 and also the readout process from a receive controller 2014 are employed.

An address 2004-1 among the message stored into the receive buffer 2004 indicates an address of a receive memory 2010, and receive data 2004-2 is written into an address 2004-1 of the receive memory 2010 in response to a write demand supplied by a write controller 2031.

In the data reception process, on the other hand, by the initialized receive controller 2014 and read controller 2035, the receive data is read from the receive memory 2010 in a similar manner that the receive data is read out from the local memory in the sixth preferred embodiment.

There are particular advantages according to the eighth preferred embodiment as follows.

(1) The tag is not required to be attached to all memory regions of the local memory, as effected in the sixth preferred embodiment.

(2) Since the receive memory 2010 is separated from the local memory 2009, there is no competition between the write demand derived from the receive buffer 2004 for the receive memory 2010, and the access demand for the local memory by the normal instruction derived from the instruction process unit 2006.

(3) The address of the local memory is employed for processing the data in the processor element during the program formation. For the data communication between the processor elements the receive address generated by utilizing the main identifier MK, sub-identifier SK and main identifier length "L" is employed, so that the address of the processor element calculation process can be separated from the address of the data communication between the processor elements. As a consequence, the program can be easily formed.

In the eighth preferred embodiment, the address space of the local memory 2009 was completely separated from the address space of the receive memory. However, in view of the hard ware realization, the address space of the receive memory may be realized as a part of the address space of the local memory 2009. For instance, a predetermined region of the local memory from the address previously designated is used as a receive memory area, and a tag is employed as a word unit within a receive memory region.

These arrangements can be realized by the following conditions. That is, when the send address is generated, and the receive address is produced in the receive controller 2014, the head address of the receive memory is added to these send address and receive address.

Figure 30:
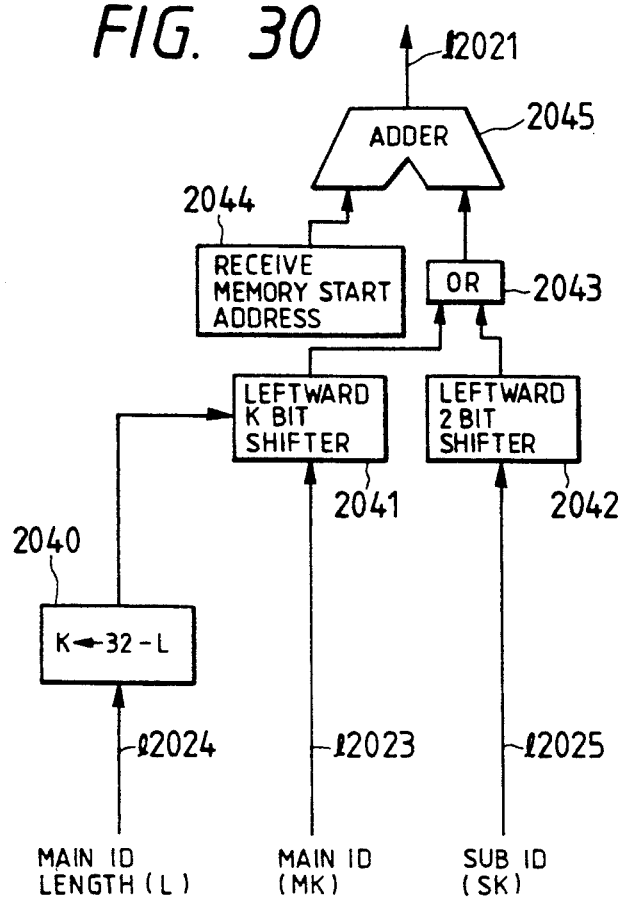
FIG. 30 is a detailed circuit arrangement of the address generating unit shown in FIG. 29.

FIG. 30 illustrates an address generating unit 2018 according a preferred embodiment. In this figure, the same reference numerals shown in FIG. 25 are employed as those for denoting the same circuit elements. In the address generating unit 2018, a register 2044 and an adder 2045 indicating a head address of the receive memory are employed.

Figure 31:
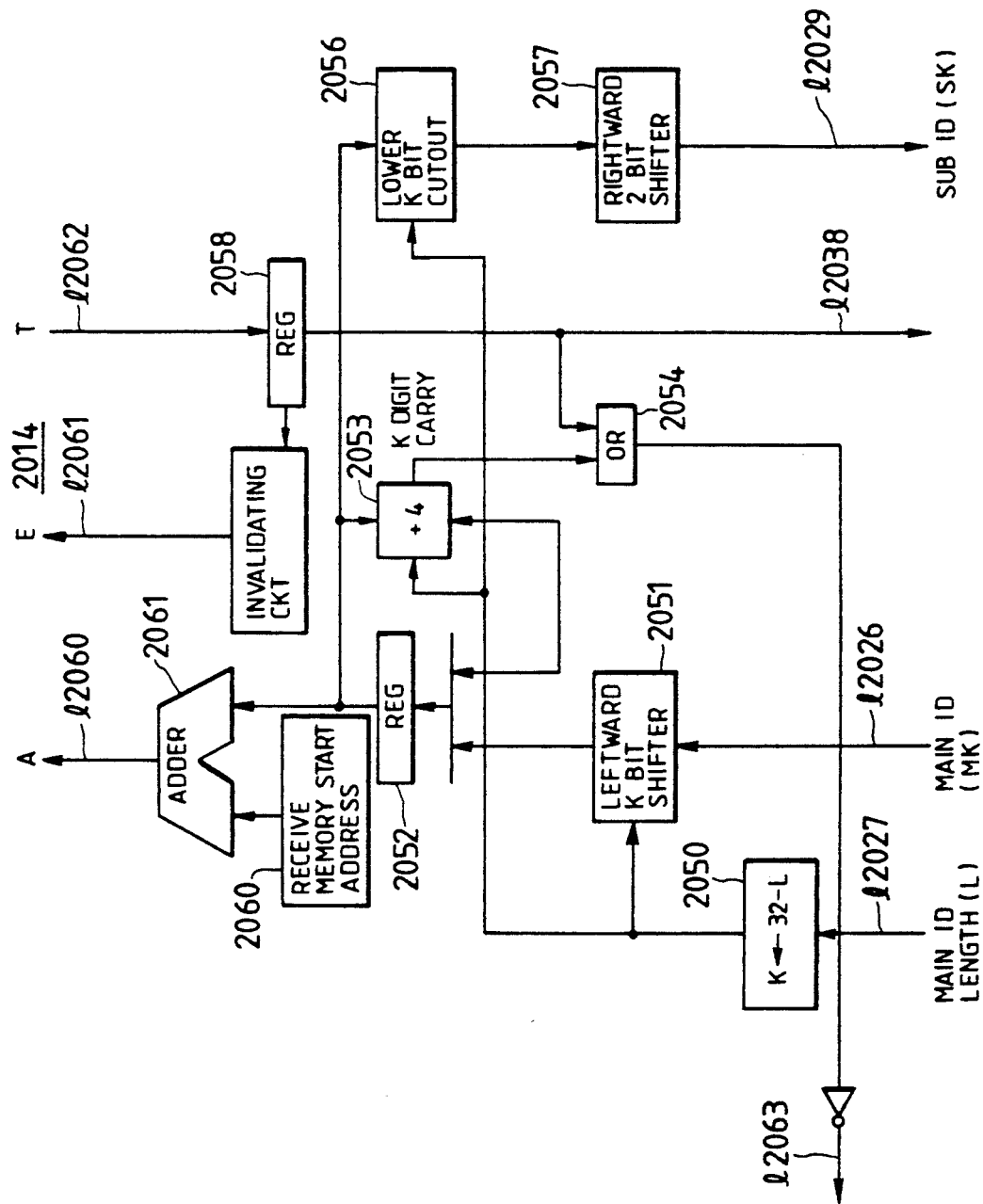
FIG. 31 is a detailed circuit arrangement of the data reception shown in FIG. 29.

FIG. 31 illustrates a receive controller 2014 according to a preferred embodiment. In this figure, the same reference numerals shown in FIG. 26 will be employed as those for denoting the same circuit elements. In the receive controller 2014, a register 2068 and an adder 2069 for representing a head address of the receive memory are newly employed.

Since these address generating unit and receive controller are modified, there is no need to recognize the realizing area of the receive memory on the local memory 2009 in view of the program.

Parallel Computer According to a Ninth Preferred Embodiment

Figure 32:
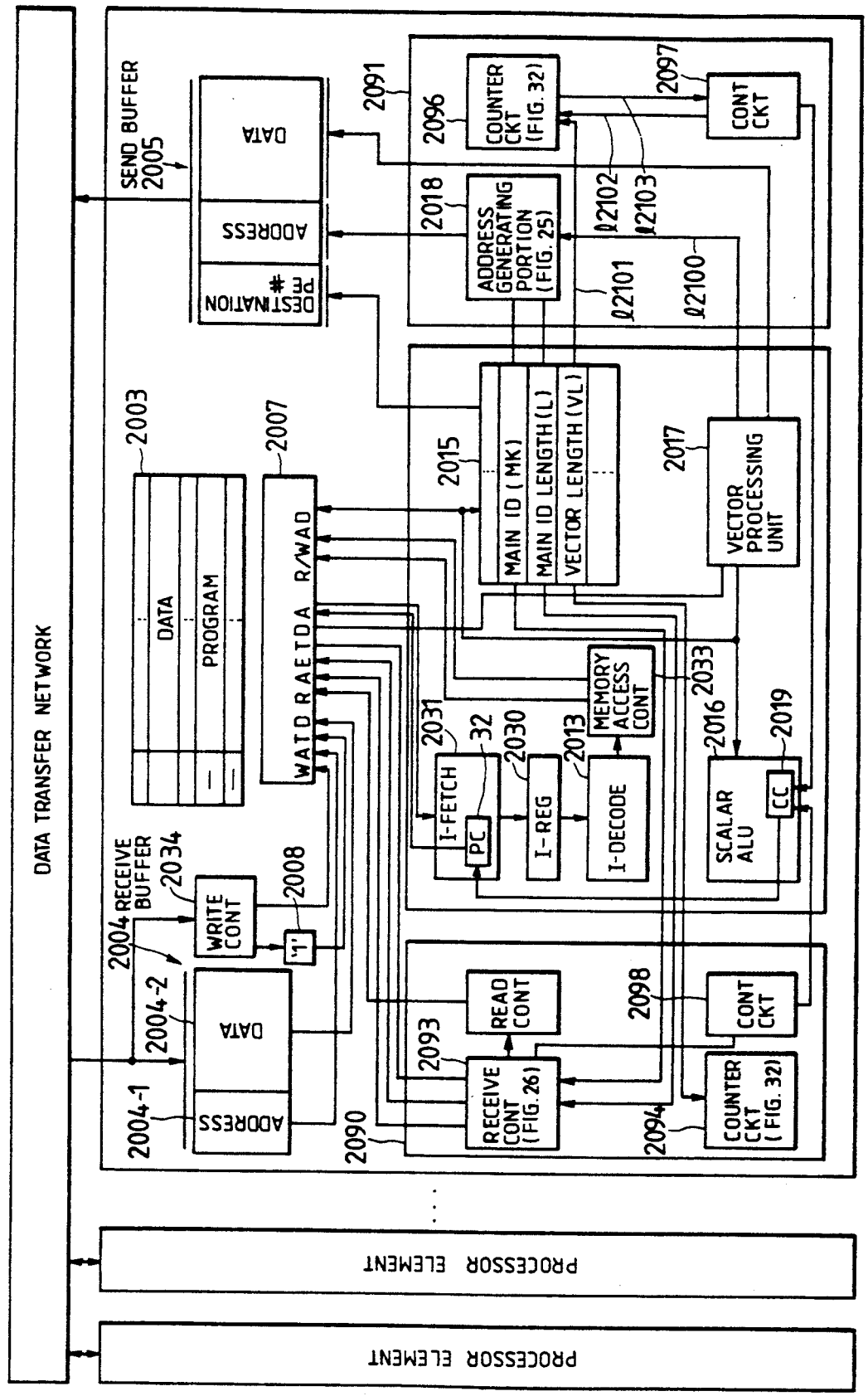
FIG. 32 is a schematic block diagram of a parallel processor according to a ninth preferred embodiment of the invention; and, FIG. 33 is a detailed circuit arrangement of the counter circuit shown in FIG. 32.

Referring now to FIG. 32, a parallel computer according to a ninth preferred embodiment of the invention will be described. In the ninth preferred embodiment, as an identifier attached to data to be sent, a main identifier indicative to this data, and also a sub-identifier for discriminating this data from other data in this data group are employed, and the main identifier retrieves the same data so as to read the data from the local memory, which is similar to those in the sixth preferred embodiment.

However, in the previous six preferred embodiment, one piece of data was transferred to the other processor element in response to one send instruction, and one piece of data was read from the associative memory device in response to one receive instruction. In the ninth preferred embodiment, to the contrary, one group of data is sent to the other processor element in response to one send instruction, and a plurality of data is read out from the local memory in response to one receive instruction. A detailed operation relating to the above-described featured operations will now be described.

It should be noted that the same reference numerals shown in FIG. 24 will be employed as those for indicating the same, or similar circuit elements shown in FIG. 32. As circuit arrangements different from those shown in FIG. 24, reference numeral 2090 is a receive unit, reference numeral 2091 denotes a send unit, reference numeral 2093 indicates a receive controller, reference numerals 2099 and 2096 represent counter circuits, reference numerals 2095 and 2097 denote control circuits, and reference numerals 2092 denotes a memory control.

The receive unit 2090 and send unit 2091 are operated independent from the instruction process unit 2006 under the control of the respective control circuits 2095 and 2097. As these control circuits 2095 and 2097, a microprocessor may be, for instance, employed. The memory controller 2092 is realized by modifying the memory controller 2007 shown in FIG. 24. The functions of this memory controller 2092 are three, i.e., the write operation by the receive buffer 2004 at the access end, the read operation by the receive unit 2090, and the write/read operations by the instruction process unit.

The receive controller 2093 is obtained by modifying the receive controller 2014 shown in FIG. 24.

First, the data send process will be described. The data send instructions employed in the parallel computer according to the ninth preferred embodiment are as follows:

SEND, VR1, GR2, GR3, and GR4.

Where SEND is an ope-code, VR1 indicates the number of the vector register to be sent, GR2 to GR4 indicate the numbers of the general-purpose registers for storing the main identifier MK with respect to the data to be transferred, the vector length VL and the destinated processor element number thereof. In addition, the main identifier length L is previously held in the general-purpose register having the number of (GR2)+1.

When this send instruction is set in the instruction register, the instruction decoding unit 2013 decodes the instruction; the destinated processor element number as the content of the above-described register is sent to the send buffer 2005; similarly, the main identifier MK and main identifier length L as the contents of the general-purpose register are sent to the address generating unit; the vector length VL is sent via the line 1 2101 to the counter circuit 2096; the number of the vector register for holding the vector data to be sent is sent to the vector process unit 2017, and furthermore the instruction controller 013 initializes the control circuit 2097 and vector process unit 2017. Thereafter, this instruction controller 2013 commences the decoding operation for the subsequent instruction.

The control circuit 2097 resets the counter circuit 2096 via the line 1 2102. From the vector process unit, the vector data are successively output by one element, and then set via the line 1 2022 into the send buffer. Furthermore, from the vector process unit, both the data and the element number are sent via the line 1 2100, as the sub-identifier SK, to the address generating unit 2018. In the address generating unit 2018, the address on the local memory in the destinated processor element and three pieces of input information are generated, and sent to the send buffer 2005. From the send buffer, the message is generated every element of the vector data, and then transferred to the data transfer network.

Figure 33:
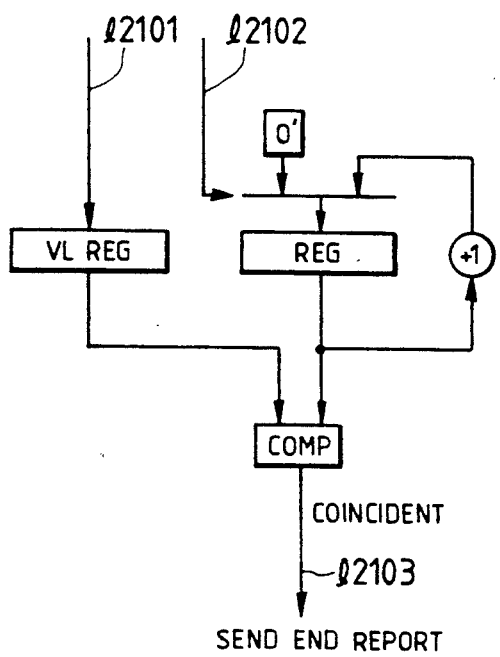

Every time the data is sent, the counter circuit performs its counting operation, and announces the end of the data transmission via the line 1 2103 to the control circuit 2097 when the counting operating is repeated VL times. As illustrated in, for example, FIG. 33, the counter circuit 2096 is arranged by two registers, a (+1) adder, and a comparator circuit.

There are two methods for announcing the end of the send instruction execution of the instruction controller 2013. As the first method, the control circuit 2097 interrupts the instruction controller 2013. As the second method, the instruction for regularly checking a condition of the data transmission device is issued in the instruction processing device 2006. As such an instruction, the following TEST SEND instruction may be considered:

TSEND.

TSEND corresponds to an ope-code of TEST SEND instruction. If the data transmission process is not yet accomplished, "1" is set into the condition code register cc 2019, whereas if the data transmission process is completed, "0" is set into this register.

The instruction controller 2013 checks the content of this condition code register cc 2019 so as to grasp the conditions of the data send device 2019.

The features according to the ninth preferred embodiment are such that the sub-identifier SK is successively produced together with the data, and moreover the address of the local memory in the destinated processor element is produced by utilizing the main identifier MK designated by the instruction, with the result that one data group is transferred in response to a single instruction.

The means employed in the ninth preferred embodiment is similar to that of the first preferred embodiment, where the message data present in the data transfer network 2012 is stored in the local memory 2003 in the destinated processor element.

Next, the data reception process will be described. The receive instructions employed in the ninth preferred embodiment are as follows:

RECEIVE, VR1, GR2 and GR3.

It should be noted that RECEIVE in an ope-code of this instruction, VR1 is the number of the vector register to be received, GR2 and GR3 are the numbers of the general-purpose registers for storing the main identifier MK with respect to the data to be received, and the vector length VL thereof. In addition, the main identifier length L is previously held in the general-purpose register having the number of (GR2) +1.

When this receive instruction is set in the instruction register 2030, the instruction controller 2013 sends the main identifier MK and main identifier length L as the contents of the above-described register to the receive controller 2093; sends the vector length VL to the counter circuit 2094; sends the number of the vector register for storing the received vector data, and furthermore the instruction controller 2017 initializes both the control circuit 2095 and vector process unit 2017. Thereafter, the instruction controller 2013 commences the execution of the decoding operation for the next instruction.

The control circuit 2095 resets the counter circuit 2094. Subsequently, the receive controller 2093 is initialized. Although the receive controller 2093 is similar to the receive controller (FIG. 26) according to the sixth preferred embodiment, a different point exists in that all of the data groups required for processing the first receive instruction are received in the ninth preferred embodiment. As a result, the (+4) adder 2053 (FIG. 26) does not perform the count-up operation until the data for the address held in the register 2052 (FIG. 26) is received. In other words, when the data for the address stored in the register 2052 (FIG. 26) is received, the (+4) adder 2053 (FIG. 26) is initialized, the address in the register 2052 (FIG. 26) is updated, and the subsequent data is received. At the same time, the counter circuit 2094 is initialized so that the counter counts up by +1. The construction of the counter circuit 2094 is the same as that of the counter circuit 2096.

The data read by the receive controller 2093 is transferred together with the sub-identifier SK to the vector processing unit 2017, and then stored in the vector register designated by the receive instruction. The sub-identifier SK is used as the element number at this moment.

Every time the counter circuit 2094 receives the data, the counting operation is carried out, and the end of the data reception is announced to the control circuit 2095 when the counting operation is repeated VL times corresponding to the vector length.

There are two methods as to the announcement of the end of the received instruction controller to the instruction controller 2013, which is similar to the methods of the data transfer device. As the first method, the control circuit 2095 interrupts the instruction controller 2013. As the second method, an instruction for regularly checking the conditions of the data receiving device is issued in the instruction processing device 2006. As such an instruction, the following TEST RECEIVE instructions are for instance, conceived:

TRCV.

TRCV is an ope-code of the TEST RECEIVE instruction. If the data reception process is not yet accomplished, "1" is set in the condition code register cc 2019, whereas if the data reception process is completed, "0" is set therein. The instruction controller 2013 can recognize the conditions of the data receive device by checking the contents of this condition code register cc 2019.

According to the present invention, in the parallel computer constructed of a plurality of processor elements including the local memories, where the data is written from the other processor element to the local memory, the overhead occurring in the data communication between the processors can be considerably reduced, so that the parallel computer can have a higher performance.

Also, according to the present invention, the data required for such a process where the exchange rule can be satisfied, can be fetched in the receive processor in the order of the data which have arrived at the local memory, so that the time period during which the data receive processor is in the rest condition can be shortened.

In addition, since the boundary for dividing the identifiers into two can be freely determined according to the parallel computer of the invention, the identifier having a limited length can be efficiently utilized.

Furthermore, a confirmation on the data reception from a plurality of processor elements can be effected by only one instruction within one time. As a consequence, even if a plurality of processor elements and also a plurality of data are sent and received, only several instructions are required. Accordingly, it can prevent the lower efficiency of the parallel process by performing a large quantity of instruction processes with respect to the data communication according to the present invention.

What is claimed is:

1. A parallel computer comprising:
(a) a plurality of processor elements connected to each other by a data transfer network;
(b) each of said processor elements including;
(b1) a local memory for holding one program of a group of programs to be executed in parallel by said computer and data related to the one program,
(b2) a processor connected to the local memory, executing instructions included in said program, said processor including means for fetching data required by one of the instructions from said local memory and for storing data obtained as a result of execution of one of the instructions into said local memory,
(b3) transmitting means connected to the network and said processor and responsive to a send request given by the program for transfer of data and a data identifier for transmitting data and the data identifier to a destination processor element via the network, the send request being given by the program being programmed to issue the send request without receiving a request for transfer of the data from the destination processor element, (b4) receiving means connected to the network for receiving therefrom, in parallel to execution of instructions by said processor, data and a data identifier both sent from another processor element, (b5) a plurality of reception data areas each for storing data received by said receiving means, (b6) a plurality of tag areas, each provided for a corresponding one of the reception data areas, each for storing a tag representative of validity of data stored in each corresponding reception data area, (b7) writing means connected to said receiving means, said reception data areas and said tag areas and responsive to receipt of data and a data identifier by said receiving means for writing the received data into one of said plurality of reception data areas determined by the received data identifier and for writing a tag indicative of validity into one of said plurality of tag areas corresponding to said one reception data area, said writing means operating in parallel to execution of instructions by said processor, and (b8) access means included in said processor and connected to said reception data areas and said tag areas and responsive to a receive request given by the program for readout of received data from one of said reception data areas for checking if a tag held in one of the tag areas corresponding to one of the reception data areas determined by a data identifier designated by the receive request indicates validity and for supplying data held in said one reception data area to a portion within said processor for processing received data as valid received data under a condition that the checked tag indicates validity, the access means including means for repeatedly checking until a tag indicative of validity is read out from the one tag area, in the event that initially the checked tag indicates invalidity.

2. The parallel computer as claimed in claim 1, wherein said plurality of reception data areas are provided within said local memory.

3. The parallel computer as claimed in claim 1, wherein said plurality of reception data areas are provided within a receive memory which is different from said local memory.

4. The parallel computer as claimed in claim 1, wherein a data identifier sent together with data from said transmitting means within each processor element is equal to an address of one reception data area within a destination processor element for storing the data; and wherein said writing means within each processing element includes means for writing data received by said receiving means into one of the reception data areas within said each processor element which has an address represented by a data identifier received together with the data by said receiving means and for writing a tag indicative of validity into one of the tag areas corresponding to the one reception data area which has the address.

5. The parallel computer as claimed in claim 4, wherein said data identifier designated by said receive request is equal to an address of one of said reception data areas to be accessed by said access means; and wherein said access means includes means for checking a tag held in one of the tag areas corresponding to one reception data area which has the address designated by the receive request and means for reading data held in the one reception data area.

6. The parallel computer as claimed in claim 5, wherein said plurality of reception data areas provided in each of said processor elements are provided in areas of said local memory.

7. The parallel computer as claimed in claim 5, wherein said plurality of reception data areas provided in each of said processor elements are provided in a receive memory which is different from said local memory.

8. A parallel computer as claimed in claim 4, wherein the send request designates, as a data identifier for specifying data to be sent, a data identifier different from the address of one of said reception data areas within said destination processor element, and said transmitting means includes means for producing an address of the one of said reception data areas within said destination processor element from said designated data identifier; and means for transmitting the generated address as a data identifier of the data.

9. The parallel computer as claimed in claim 8, wherein said data identifier designated by the send request corresponds to an address difference between the address of one of said reception data areas within said destination processor element into which data to be sent is to be stored and an address (a head address) of a head one of said plurality of reception data areas within said destination processor element, and said producing means includes an adder means for adding said address difference and said head address, to produce the address of the one reception data area within said destination processor element.

10. The parallel computer as claimed in claim 8, wherein the data identifier designated by said receive request includes information related to one of said reception data areas to be accessed by said access means, and said access means includes means for generating an address of the one reception data area from said information designated by said receive request and for accessing one of the tag areas corresponding to the one of the data reception areas which has the generated address.

11. The parallel computer as claimed in claim 10, wherein said data identifier designated by said receive request corresponds to a difference between the address of the one of said reception data areas to be accessed by said access means and an address (a head address) of a head one of the reception data areas; and wherein said access means includes means for producing the address of the one reception area from the difference designated by the receive request and the head address.

12. The parallel computer as claimed in claim 11, wherein said reception data areas within each processing element are provided in said local memory employed in said each processor element.

13. The parallel computer as claimed in claim 1, wherein said data identifier sent from said transmitting means is different from an address of one of said reception data areas within the destination processor element; and wherein said writing means includes means for determining an address of one of reception data areas into which data received by said receiving means is to be written, based upon a data identifier received together with the data.

14. The parallel computer as claimed in claim 13, wherein said data identifier sent from said transmitting means within each processor element is a difference between the address of one of said reception data areas within said destination processor element and an address (a head address) of a head one of said plurality of reception data areas within said destination processor element, and said means for determining included in said writing means within each processor element includes adder means for adding an address (a head address) of a head one of said plurality of reception data areas within said each processor element to said difference received together with the received data, so as to produce the address of the one reception data into which the received data is to be written.

15. The parallel computer as claimed in claim 14 wherein said data identifier designated by said receive request corresponds to an address difference between the address of the one of said reception data areas to be accessed by said access means within said each processor element and (a head address) an address of a head one of the reception data areas, and said access means within said each processor element includes means for generating the address of the one of said reception data areas to be accessed by said access means by adding said head address to the address difference corresponding to said designated data identifier.

16. The parallel computer as claimed in claim 13, wherein said data identifier sent from said transmitting means within each processor element is a data area serial number applied to one of said reception data areas provided in the destination processor element, and said determining means included in said writing means within each processor element includes means for producing the address of the one of said reception data areas into which the received data is to be written, from a data area serial number received together with the received data.

17. The parallel computer as claimed in claim 16, wherein said data identifier designated by said receive request corresponds to a data area serial number attached to the one of said reception data areas to be accessed by said access means, and said access means includes means for generating the address of the one of said reception data areas to be accessed by said access means from a data area serial number represented by said data identifier designated by said receive request.

18. The parallel computer as claimed in claim 13, wherein said data identifier designated by said receive request is related to the address of one of said reception data areas to be accessed by said access means, and said access means includes means for generating the address of the one of said reception data areas to be accessed by said access means in response to said data identifier designated by said receive request.

19. The parallel computer as claimed in claim 1, wherein the send request requires to send a set of elements of vector data each together with a corresponding one of a set of data identifiers; and wherein said processor includes:
means for supplying each element of the vector data requested to said transmitting means in response to the request, and
means for generating a set of data identifiers each determined for a corresponding one element of the vector data to be sent in response to the send request and for supplying the data identifiers to said transmitting means, so as to transmit each of the data identifiers together with a corresponding element.

20. The parallel computer as claimed in claim 1, wherein said receive request requires readout of a set of elements of vector data from ones of said reception data areas within each processor element; and
wherein said access means further includes:
means for sequentially generating a set of data identifiers each determined for a corresponding element of the vector data to be read in response to the receive request, and
means for sequentially reading a number of tags from ones of the tag areas corresponding to ones of the group of reception data areas determined by the respective generated data identifiers and for supplying data held in the determined ones of the group of reception data areas each under a condition that a tag held in a corresponding tag area indicates validity.

21. The parallel computer as claimed in claim 1, wherein the data identifier sent by said transmitting means is constructed of a main identifier commonly predetermined for a plurality of data to which the data sent with the data identifier belongs, and a sub-identifier predetermined so as to be specific to the data sent by said transmitting means among the plurality of data;
wherein the data identifier designated by the receive request designates a main data identifier commonly predetermined for a group of data to be read; and
wherein said access means further includes means responsive to the main data identifier designated by the receive request for determining a number of reception areas within the group of reception data areas, for checking if tags held in a number of tag areas corresponding to the number of determined reception data areas indicate validity and for supply data held in at least one of the number of determined reception data areas corresponding to one of the number of the tag areas which has a tag which indicates validity.

22. The parallel processor as claimed in claim 1, wherein said send and receive requests are respectively given in terms of corresponding ones of the instructions of the program.

23. The parallel computer as claimed in claim 1, wherein said access means includes means responsive to the receive request for reading both received data and a corresponding tag respectively held in one of the reception data areas determined by the data identifier designated by the receive request and in a corresponding one of the group of tag areas, and the repeating means includes means for repeating the reading in case the read tag indicates invalidity, until the read tag indicates validity.

24. A parallel computer constructed of a plurality of processor elements and a network for connecting said plurality of processor elements for transfer of data therebetween, comprising:
a local memory provided in each processor element and including a plurality of data regions which include a group of receive data regions holding a number of data received from other processor elements;
a plurality of tag regions each provided for a corresponding one of the group of receive data regions of said local memory within said each processor element, each of said tag regions holding a tag representing whether data held by a corresponding one receive data region is valid or invalid;

means provided in said each processor element for transmitting data to another destination processor element via the network, in response to a send request from a program being executed by said each processor element, the program being programmed so as to issue the send request without receiving a request for transmission of the data, from a program being executed by the destination processor;

writing means provided in said each processor element for receiving data transmitted from another processor elment via the network;

means provided in said each processor element for writing the received data into one receive data region among the group of receive data regions provided in said each processor element;

means provided in said each processor element for setting, in a tag region corresponding to said one receive data region, a tag representative that a content of the one receive data region is valid, when the received data is written into the one receive data region; and, access means provided in said each processor element and responsive to a read request which has been issued from the program being executed by said each processor element and which requests reading of received data from one of the group of receive data regions for checking if one tag held within one of said tag regions provided in correspondence to said one receive data region indicates validity, and for repeating the checking, if the one tag indicates invalidity initially, until said one tag indicates validity.

25. The parallel computer as claimed in claim 24, wherein said transmitting means provided in said each processor element includes means for sending a logical address assigned to the data to be transmitted, together with the data;

wherein said writing means provided in said each processor element includes;

a writing address transforming circuit for transforming a logical address received together with data received by said receiving means into a corresponding real address for one of the group of receive data regions provided within said each processor element, into which the received data is to be written; and means for writing the received data into the one receive data region having the real address, among the group of receive data regions provided within said each processor element;

wherein said access means provided in said each processor element includes;

a reading address transforming circuit for transforming a logical address designated by the program being executed by said each processor element for one of the group of receive data regions within said each processor element from which received data is to be read into a real address for the one receive data region; and means for reading received data from the one receive data region having the real address, among the group of receive data regions provided within each processor element, after executing the checking of one of the group of tag regions corresponding to the one receive data region.

26. The parallel computer as claimed in claim 24, wherein said transmitting means provided within said each processor element includes;

means for sequentially generating a sequence of addresses each for a corresponding one of a group of data each to be sent to a same destination processing element and each designating an address of one of the group of receive data regions provided within the destination processing element into which the corresponding data is to be written; and means for sequentially sending the group of data to the destination processor element via the network, each together with a corresponding one of the sequence of the generated addresses;

wherein said access means provided within said each processor element includes;

means for sequentially generating a sequence of read addresses each for a corresponding one of a group of data each to be read from ones of the group of receive data regions provided within said each processor element, each read address designating an address of one of the group of receive data regions provided within said each processor element from which data corresponding to said each read address is to be read.

27. The parallel computer as claimed in claim 26, wherein the group of data regions within each processor element is provided in a same memory as said local memory.

28. A parallel computer comprising:
a plurality of processor elements;
a network for connecting said plurality of processor elements;
each processor element including:
  a local memory for holding one of programs to be executed in parallel by said processor elements and data to be used by the program;
  means for executing instructions of the program;
  means for transmitting data to a destination processor element via the network in response to a send instruction within the program, the program being programmed so as to execute the instruction without receiving a request for transmission of the data from the destination processor element;
  means for receiving from the network data sent from another processor element;
  a receive memory including a group of data regions each prepared for holding data received from another processor element and a plurality of tag regions each provided for a corresponding one of the group of data regions, each of said tag regions being prepared for holding a tag representative of whether data held in a corresponding data region is valid or invalid;
  writing means for writing data received by said means for receiving into one of the group of data regions;
  means for setting in one of the tag regions corresponding to the one data region to a tag representative of validity when the received data is written into the one data region of said receive memory by said writing means; and,
  access means responsive to a receive instruction of the program, which requests read out of received data from one of the group of data regions designated by the receive instruction, the access means including,
means for checking if a tag stored in one tag region corresponding to said one data region indicates validity,
means for repeating the checking until said one tag represents validity in case the one tag represents invalidity initially, and
means for supplying data held in said one data region under a condition that the one tag indicates validity.

29. A parallel computer comprising:
(a) a plurality of processor elements each for executing one of programs to be executed in parallel by said processor elements, and
(b) a network for transferring data between said plurality of processor elements,
(c) each of said processor elements including:
(c1) a local memory for holding one of the programs and data used by the program;
(c2) a group of data regions each for holding data sent from another processor element;
(c3) a group of tag regions each provided in correspondence to one of the group of data regions and each prepared for holding a tag indicative of validity of data held in a corresponding one of the group of data regions;
(c4) means for executing instructions of the program;
(c5) means responsive to execution by said executing means, of a send instruction which requires transmission of one data which belongs to a group of data to a destination processor element for generating an address of one of the group of data regions within the destination processor element, into which the one data is to be written, based upon a main identifier and a sub-identifier designated by the send instruction,
the main identifier being predetermined for the data group and the sub-identifier being predetermined for the one data;
the program being programmed so as to execute the send instruction without receiving a request for transmission of the one data from the destination processor element;
(c6) means responsive to the send instruction for transmitting to said network a message containing the data and the generated address;
(c7) means for receiving a message sent from another processor element via the network, in parallel to execution of instructions by said executing means;
(c8) write means for writing received data included in the received message into one of the group of data regions within said each processor element, based upon an address contained in said received message and for writing a tag which indicates validity into one of the group of tag regions corresponding to the one data region; and
(c9) access means responsive to execution by said execution means, of a receive instruction which requires readout of received data, for checking if one of a number of tags held within a number of selected tag regions provided in correspondence to a number of successively located selected data regions indicates validity, the selected data regions being determined by a main identifier designated by said receive instruction, and responsive to a tag held in one of the number of selected tag regions indicating validity for reading received data from one of said number of selected data regions corresponding to the one selected tag region.

30. A parallel processor as claimed in claim 29, wherein the address generating means includes:
means for generating the address, based upon said main identifier and said sub-identifier, and information representative of an effective length of said main identifier.

31. The parallel processor as claimed in claim 29, wherein the group of data regions within each processor element is provided in a same memory as said local memory.

32. A parallel computer comprising:
(a) a plurality of processor elements each for executing one of programs to be executed in parallel, and
(b) a network for transferring data between said plurality of processor elements,
(c) each of said processor elements including:
(c1) a local memory for holding one of the programs and data used by the program;
(c2) a group of data regions each for holding data sent from another processor element;
(c3) a group of tag regions each provided in correspondence to one of the group of data regions and each prepared for holding a tag indicative of validity of data held in a corresponding one of the group of data regions;
(c4) executing means for executing instructions of the program;
(c5) means responsive to execution by said executing means, of a send instruction which requires transmission of one data which belongs to a group of data to a destination processor element for transmitting to said network a message containing the one data and a data identifier comprised of a main identifier and a sub-identifier,
the main identifier being predetermined for the data group and the sub-identifier being predetermined for the one data,
the program being programmed so as to execute the send instruction without receiving a request for transmission of the one data from the destination processor element;
(c6) means for receiving a message supplied from said network, in parallel to execution of instructions by said executing means;
(c7) means for generating an address of one of the group of data regions into which received data included in the received message is to be written, from a main identifier and a sub-identifier contained in the received message, for writing the received data into the one data region based upon said address, and for writing a tag which indicates validity into one of the group of tag regions corresponding to the one data region.
the one data region being one determined by the sub-identifier among a number of successive data regions determined by the main identifier within the group of data regions within said each processor element; and
(c8) access means responsive to execution by said executing means, of a receive instruction within the program, which requires readout of received data for checking if one of a number of tags held within a number of selected tag regions provided in correspondence to a number of successively located selected data regions indicated validity, the selected data regions being determined by a main identifier designated by said receive instruction, and responsive to a tag held in one of the number of selected tag regions indicating validity for reading received data from one of said number of selected word regions corresponding to the one selected tag region.

33. A parallel processor as claimed in claim 32, wherein the address generating means includes:
means for generating the address, based upon said main identifier and said sub-identifier, and information representative of an effective length of said main identifier.

34. A parallel computer comprising:
(a) a plurality of processor elements, and
(b) a network for transferring data between said plurality of processor elements,
(c) each of said processor elements including:
   (c1) a local memory for holding one of programs to be executed in parallel by said processor elements and data used by the program;
   (c2) a group of data regions each for holding data sent from another processor element;
   (c3) a group of tag regions each provided in correspondence to one of the group of data regions and each prepared for holding a tag indicative of validity of data held in a corresponding one of the group of data regions;
   (c4) executing means for executing instructions of the program;
   (c5) means responsive to execution by said executing means, of a send instruction which requires transmission of a group of sequentially ordered data elements to a destination processor element for generating, for each data element of the group, a corresponding address of a corresponding one of the group of data regions within the destination processor element, into which said each data element of the group is to be written, the send instruction being executed without receiving a request for transmission of the group from the destination processor element,
   the one data region being one determined by sequential order of said each data element among a number of successively located selected data regions within the group of data regions within the destination processor element,
   the selected data regions being determined by information designated by the send instruction;
   (c6) means for sequentially transmitting the group of data elements to the destination processor element via the network, each data element being transmitted together with the address generated by the address generating means for said each data element;
   (c7) means for sequentially receiving, via the network, a group of sequentially ordered data elements sent from one of the processor elements each together with an address generated for each data element;
   (c8) means for writing each data element of the received group into one of the data regions within the group of data regions, based upon the address accompanying said each data element and for writing a tag indicative of validity into one of the group of tag regions corresponding to the one data region; and
   (c9) access means responsive to execution by said executing means, of a receive instruction which requires receipt of a group of data elements for sequentially reading the required group of data elements from a number of successively located selected data regions within the group of data regions, said access means including,
      means for determining addresses of the number of selected data regions in response to information designated by the receive instruction, and
      means for checking if each of a number of selected tag regions within the group of tag regions, corresponding to each of the number of selected data regions holds a tag indicative of validity before data held in said each selected data region is read out.

35. A method for inter-processor communication of data in a parallel computer which comprises a plurality of processors each of which including a local memory for holding one of programs to be executed in parallel and data related to the program, a group of reception data areas each for holding data received from another processor via the network and a group of tag areas each provided in correspondence to one of the reception data areas and each for holding a tag which indicates whether or not data held in a corresponding reception data area is valid, the method comprising steps executed by each processor element, the steps including:
transmitting to a destination processor element, data and information related to an address of one of the group of reception data areas within said destination processor element into which the data is to be written, in response to a send request issued by a program being executed by said each processor element, the program being programmed so as to issue the send request without receiving a request from the destination processor element for transmission of the data;
receiving data and information related to an address both transmitted from another processor element, the receiving being done in parallel to execution of instructions of the program by said each processor element;
writing the received data into one of the group of reception data areas, in response to the received address related information;
writing a tag which indicates validity into one of the group of tag regions corresponding to said one reception data area;
checking if a tag held in one of the tag areas indicates validity, in response to a receive request issued by the program, the one tag region corresponding to one of the reception data areas designated by the receive request;
repeating the checking until the tag indicates validity, in case the tag indicates invalidity initially; and
supplying data held in said one reception data areas as valid data for processing by the destination processor, under a condition that the tag has been found as one indicating validity.

36. A method according to claim 35, further comprising the steps of:
simultaneously reading, (a) data held in said one reception data area designated by the receive request and (b) the tag held in said corresponding tag region; and repeating the reading step;

wherein the checking step is executed for the tag read out by the reading step;

the supplying step is executed for the data read out by the reading step;

the repeating step of the reading is executed in case the checked tag has been found as one which indicates invalidity; and the repeating step of the checking step is executed for a tag read out by the repeating step of the reading.

37. A method according to claim 35, wherein the send request and the receive requests are given respectively by corresponding ones of the instructions of the program.

38. A method according to claim 35, further comprising the step of writing a tag which indicates invalidity in the one tag region which has a tag which has been checked and found as one indicating validity, after the supplying of the valid received data.

39. A method according to claim 35, wherein the checking, repeating and supplying are all executed in response to the receive request.

40. A method according to claim 35, wherein the address related information transmitted by the transmitting step is an address of one of the group of reception data areas within the destination processor into which the data transmitted together with the information is to be written.

41. A method according to claim 40, further comprising the step of generating, in response to the send request, the address of the one of the group of reception data areas within the destination processor element into which the data transmitted is to be written, based on address related information designated by the send request and different from the address, so that the generated address is transmitted together with the data.

42. A method according to claim 41, wherein the address related information designated by the send request is an address difference between a head one of the data reception areas within the destination processor element and the one data reception area into which the transmitted data is to be written within the destination processor element.

43. A method according to claim 42, further comprising the step of generating, in response to the receive request, the address of the one of the group of reception data areas within said each processor element from which received data is to be read, based on address related information designated by the receive request and different from the address, so that the generated address is used in accessing the one reception data area;

wherein the address related information designated by the receive request is an address difference between a head one of the data reception areas within said each processor element and the one data reception area from which received data is to be read.

44. A method according to claim 35, wherein the address related information is an address difference between a head one of the data reception areas within the destination processor element and the one data reception areas within the destination processor element into which the transmitted data is to be written.

45. A method according to claim 44, further comprising the step of generating, in response to the receive request, the address of the one of the group of reception data areas within the processor element from which received data is to be read, based on address related information designated by the receive request and different from the address, so that the generated address is used in accessing the one reception data area;

wherein the address related information designated by the receive request is an address difference between a head one of the data reception areas within said each processor element and the one data reception area from which received data is to be read.

* * * * *

UNITED STATES PATENT AND TRADEMARK OFFICE
CERTIFICATE OF CORRECTION

PATENT NO. : 5,297,255
DATED : March 22, 1994
INVENTOR(S) : Naoki Hamanaka, et al.

It is certified that error appears in the above-identified patent and that said Letters Patent is hereby corrected as shown below:

Title Page:

[75] Inventors: Naoki Hamanaka, Tokyo; Teruo Tanaka, Koyasumachi, both of Japan

In the Claims:

Claim 32, column 45, line 2, delete "indicated" and substitute therefor --indicates--.

Claim 35, column 46, line 61, after "one" insert --of the group of--.

Claim 42, column 48, line 3, delete "data reception" and substitute therefor --reception data--.

Signed and Sealed this

Thirtieth Day of August, 1994

Attest:

BRUCE LEHMAN

Attesting Officer     Commissioner of Patents and Trademarks